US012549401B2

(12) United States Patent
Mishra et al.

(10) Patent No.: US 12,549,401 B2
(45) Date of Patent: Feb. 10, 2026

(54) OPTIMAL MULTICAST FORWARDING FOR SOURCES BEHIND EVPN FABRIC

(71) Applicant: Cisco Technology, Inc., San Jose, CA (US)

(72) Inventors: Mankamana Prasad Mishra, San Jose, CA (US); Sameer R Gulrajani, Fremont, CA (US); Ali Sajassi, Alamo, CA (US); Swadesh Agrawal, Fremont, CA (US); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 18/317,895

(22) Filed: May 15, 2023

(65) Prior Publication Data

US 2024/0195648 A1 Jun. 13, 2024

Related U.S. Application Data

(60) Provisional application No. 63/386,440, filed on Dec. 7, 2022.

(51) Int. Cl.
*H04L 12/46* (2006.01)
*H04L 12/18* (2006.01)

(52) U.S. Cl.
CPC ........ *H04L 12/185* (2013.01); *H04L 12/4633* (2013.01)

(58) Field of Classification Search
CPC .......................... H04L 12/185; H04L 12/4633
(Continued)

(56) References Cited

U.S. PATENT DOCUMENTS

2013/0100851 A1  4/2013  Bacthu et al.
2016/0021015 A1* 1/2016  Thoria ............... H04L 47/2483
                                                     370/235

(Continued)

FOREIGN PATENT DOCUMENTS

EP  3247072 A1  11/2017
EP  3425858 A1  1/2019

OTHER PUBLICATIONS

International Search Report and Written Opinion for International Application No. PCT/US2023/081510, mailed Mar. 22, 2024, 20 Pages.

*Primary Examiner* — Ario Etienne
*Assistant Examiner* — Kidest Mendaye
(74) *Attorney, Agent, or Firm* — Polsinelli P.C.

(57) ABSTRACT

A system and associated methods provide procedures for establishing multicast connections and forwarding multicast content from a source to a subscriber when an ingress provider edge in communication with the subscriber is connected to an egress provider edge device belonging to an EVPN instance, especially in cases where the egress provider edge device is not receiving content from the source. The system configures "backup" provider edge devices belonging to the EVPN instance to temporarily forward the multicast content to the egress provider edge device on behalf of the source, enabling the ingress provider edge device and subscriber to continue to receive the multicast content from the source while the multicast network adjusts to recognize a new egress provider edge device. Methods of establishing connections between the ingress provider edge device and the correct egress provider edge device are also provided to avoid flooding and inefficient content forwarding throughout the network.

20 Claims, 17 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2017/0289216 A1* | 10/2017 | N .............................. | H04L 45/22 |
| 2019/0036717 A1* | 1/2019 | Kebler .................. | H04L 45/484 |
| 2019/0166407 A1 | 5/2019 | Sajassi et al. | |
| 2020/0127885 A1* | 4/2020 | Arora .................. | H04L 12/1886 |

* cited by examiner

OPTIMAL MULTICAST FORWARDING FOR SOURCES BEHIND EVPN FABRIC

CROSS-REFERENCE TO RELATED APPLICATIONS

This application claims priority to U.S. Provisional Application No. 63/386,440, filed on Dec. 7, 2022, which is expressly incorporated by reference herein in its entirety.

BACKGROUND

Multicast networks ensure steady streams of content delivery by providing a multicast group including a plurality of redundant sources that communicate with a network. These redundant sources can be at completely different geographic locations. One benefit to multicast networks is that when a source or provider edge device delivering content fails, another redundant source or provider edge device belonging is available to take its place. However, current "bridging" strategies (e.g., for ensuring that a subscriber can still receive multicast content even when connected to a provider edge device that is not receiving multicast content from the source) are inefficient and can lead to problems such as flooding of the multicast network or unavailability of the multicast content to the subscriber.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
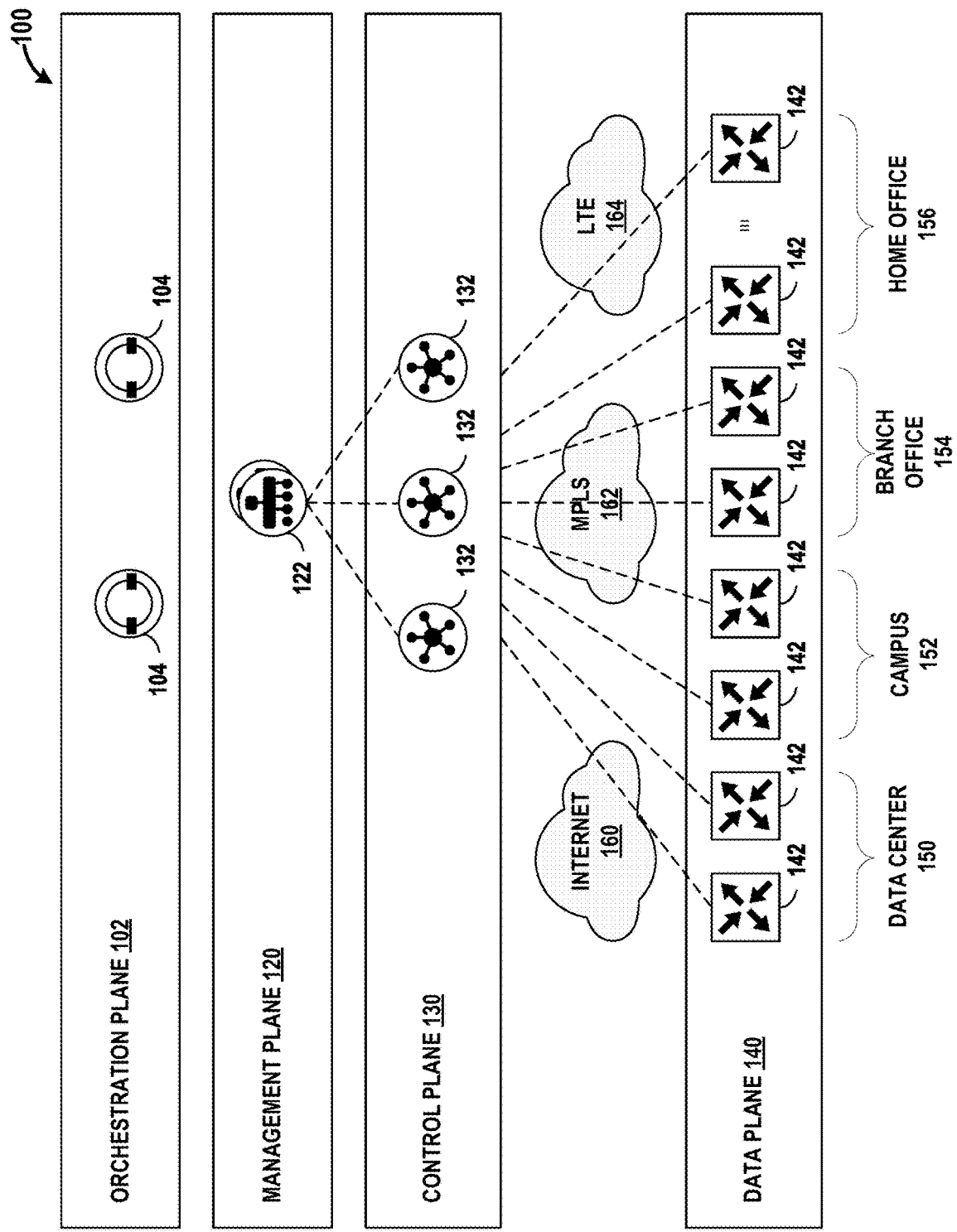
FIG. 1 illustrates an example of a high-level network architecture in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Multicast networks ensure steady streams of content delivery by providing a multicast group including a plurality of redundant provider edge devices commonly belonging to an Ethernet Virtual Private Network (EVPN) instance that communicate multicast content from a source to a subscriber within a multicast network. One benefit to multicast networks is that when a source delivering multicast content is no longer communicating with an egress provider edge device, another provider edge device and/or source is available to take its place. However, problems arise when an ingress provider edge device (e.g., that receives multicast content on behalf of the subscriber) is unaware which provider edge device of the EVPN instance it should connect with to receive multicast content (e.g., the egress provider edge device). Further, problems arise if the source stops communicating with the egress provider edge device and the ingress provider edge device is unaware of such a change. In both scenarios, the ingress provider edge device may not receive the multicast content destined for the subscriber because the ingress provider edge device is not "looking" for the multicast content from the correct provider edge device, resulting in data loss.

Techniques described herein provide procedures for forwarding multicast content from a source to a subscriber when an ingress provider edge in communication with the subscriber is connected to an egress provider edge device that is no longer receiving content from the source by configuring "backup" provider edge devices to temporarily forward the multicast content to the egress provider edge device on behalf of the source so that the ingress provider edge device and the subscriber can continue to receive the multicast content from the source while the multicast network adjusts to recognize a new egress provider edge device. Methods of establishing connections between the ingress provider edge device and the correct egress provider edge device are also provided to avoid flooding and inefficient content forwarding throughout the network.

In one aspect, a method for establishing connection between a source and a subscriber includes: sending, by an ingress provider edge device in communication with a subscriber requesting content from a source over a multicast network, a join request message to a plurality of provider edge devices of an Ethernet Virtual Private Network (EVPN) instance, the source being in communication with one or more provider edge devices of the EVPN instance; designating a first provider edge device of the plurality of provider edge devices of the EVPN instance as an egress provider edge device; sending, by the egress provider edge device, a source announcement to a first backup provider edge device of the EVPN instance and to the ingress provider edge device; establishing a reverse path forwarding tunnel between the egress provider edge device and the ingress provider edge device; establishing a unicast tunnel between the first backup provider edge device and the egress provider edge device; and forwarding, by the egress provider edge device, multicast content from the source to the ingress provider edge device.

The method can further include: forwarding, by the ingress provider edge device, multicast content from the egress provider edge device to the subscriber.

The method can further include: advertising, by the plurality of provider edge devices of the EVPN instance and to the ingress provider edge device, a Unicast Prefix Advertisement that includes information about a location of the respective provider edge devices of the EVPN instance; the Unicast Prefix Advertisement further including Extended Community (EC) information indicative of the EVPN instance. This "advertising" step can be applied before the ingress provider edge device sends the join request (e.g., so the ingress provider edge device knows which provider edge devices belong to the EVPN instance).

The source announcement can include Virtual Routing and Forwarding for Internet Protocol (IP-VRF) EC information and Virtual Routing and Forwarding for Media Access Control (MAC-VRF) EC information. As such, the method can further include: establishing the reverse path forwarding tunnel between the ingress provider edge device and the egress provider edge device using the IP-VRF EC information; and establishing the unicast tunnel between the first backup provider edge device and the egress provider edge device using the MAC-VRF EC information.

In case the egress provider edge device is no longer receiving the multicast content from the source, the method can further include: receiving, at the first backup provider edge device, multicast content from the source; and forwarding, at the first backup provider edge device and over the unicast tunnel between the first backup provider edge device and the egress provider edge device, multicast content from the source to the egress provider edge device. Further, the method can include: designating the first backup provider edge device as a new egress provider edge device, the new egress provider edge device being in communication with the source; establishing a reverse path forwarding tunnel between the new egress provider edge device and the ingress provider edge device; establishing a unicast tunnel between a second backup provider edge device of the EVPN instance and the new egress provider edge device, the second backup provider edge device of the EVPN instance being operable for receiving multicast content from the source and forwarding the multicast content to the new egress provider edge device; and forwarding, by the new egress provider edge device, multicast content from the source to the ingress provider edge device.

In another aspect, a method for providing an ingress provider edge device with multicast content from a source when a connected egress provider device is no longer receiving the multicast content from the source includes: sending, by an egress provider edge device of a plurality of provider edge devices of an Ethernet Virtual Private Network (EVPN) instance, a source announcement to a first backup provider edge device of the EVPN instance and to an ingress provider edge device, the egress provider edge device being in communication with a source operable for sending multicast content and the ingress provider edge device being in communication with a subscriber requesting multicast content from the source; establishing a unicast tunnel between the first backup provider edge device and the egress provider edge device; receiving, at the first backup provider edge device, multicast content from the source; and forwarding, at the first backup provider edge device and over the unicast tunnel between the first backup provider edge device and the egress provider edge device, multicast content from the source to the egress provider edge device.

In another aspect, a system for providing an ingress provider edge device with multicast content from a source when a connected egress provider device is no longer receiving the multicast content from the source includes one or more processors in communication with one or more memories, the one or more memories including instructions executable by the one or more processors to: send, by an egress provider edge device of a plurality of provider edge devices of an Ethernet Virtual Private Network (EVPN) instance, a source announcement to a first backup provider edge device of the EVPN instance and to an ingress provider edge device, the egress provider edge device being in communication with a source operable for sending multicast content and the ingress provider edge device being in communication with a subscriber requesting multicast content from the source; establish a unicast tunnel between the first backup provider edge device and the egress provider edge device; receive, at the first backup provider edge device, multicast content from the source; and forward, at the first backup provider edge device and over the unicast tunnel between the first backup provider edge device and the egress provider edge device, multicast content from the source to the egress provider edge device.

In another aspect, one or more non-transitory computer-readable media includes computer-readable instructions, which when executed by one or more processors of a provider edge device, cause the provider edge device to: receive, at a first backup provider edge device and from an egress provider edge device of a plurality of provider edge devices of an Ethernet Virtual Private Network (EVPN) instance, a source announcement, the egress provider edge device being in communication with a source operable for sending multicast content; establish, at the first backup provider edge device, a unicast tunnel between the first backup provider edge device and the egress provider edge device; receive, at the first backup provider edge device, multicast content from the source; and forward, at the first backup provider edge device and over the unicast tunnel between the first backup provider edge device and the egress provider edge device, multicast content from the source to the egress provider edge device.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for methods to forward multicast content from a source to a subscriber when an ingress provider edge in communication with the subscriber is connected to a provider edge device that is not receiving content from the source. In current multicast EVPN technologies, an ingress provider edge device will establish a connection with a provider edge device within an EVPN instance that may have the multicast content from the source, however the ingress provider edge device may not select the correct provider edge device (e.g., an egress provider edge device), leading to unavailability of the multicast content to the subscriber. One non-preferred solution to this problem involves the egress provider edge device forwarding the multicast content to the connected "peers" within the same EVPN instance, including the provider edge device to which the ingress provider edge device is connected, which can then forward the multicast content onward to the subscriber.

Further, in current implementations, if the ingress provider edge is correctly connected to the egress provider edge device, but the egress provider edge device stops receiving multicast content from the source due to a source move or an ethernet segment failure, the ingress provider edge device may not be aware of such a change and will continue to "look" for the multicast content from the egress provider edge device which can also lead to interruption of the multicast content through significant, if not total, packet loss during this interval until the multicast network adjusts to recognize a new egress provider edge device.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
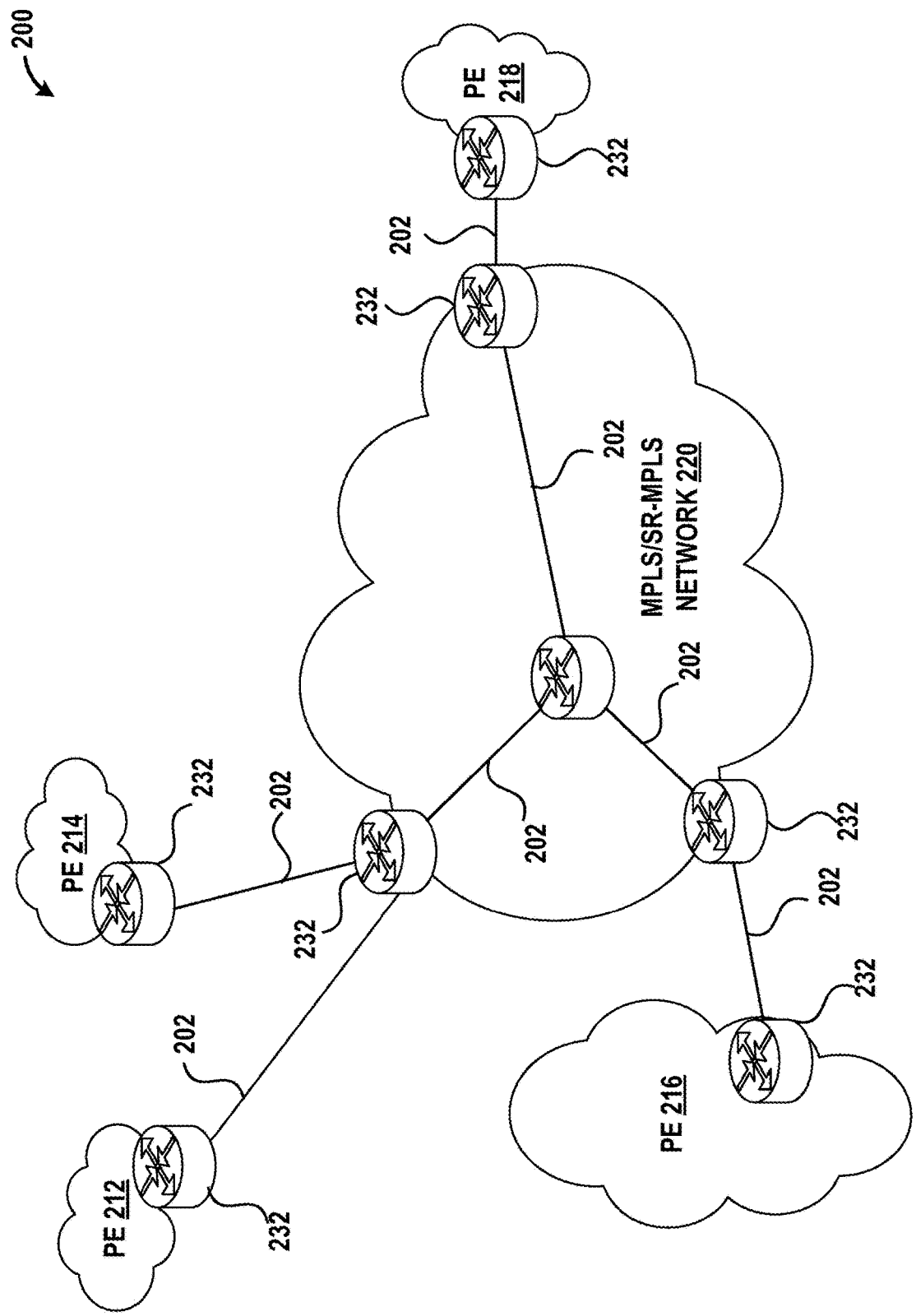
FIG. 2 illustrates an example communication network including one or more autonomous systems (ASes) in accordance with some aspects of the present technology.

FIG. 2 is a schematic block diagram of an example computer network 200 illustratively comprising network devices (e.g., provider edge devices) interconnected by various methods of communication. For instance, the links 202 may be any suitable combination of wired links and shared media (e.g., wireless links, Internet Exchange Points, etc.) where certain network devices, such as, e.g., routers, computers, etc., may be in communication with other network devices, e.g., based on distance, signal strength, current operational status, location, etc. Those skilled in the art will understand that any number of network devices, links, etc. may be used in the computer network, and that the view shown herein is for simplicity.

Data packets (e.g., traffic and/or messages sent between the network devices) may be exchanged among the network devices of the computer network 200 using predefined network communication protocols such as certain known wired protocols, as well as wireless protocols or other shared-media protocols where appropriate.

The computer network 200 includes a set of autonomous systems (AS); in the examples outlined herein, the set of ASes can include provider edge devices (PEs) 212, 214, 216 and 218 that can be PIM domains, and can further include MPLS/SR-MPLS network 220 therebetween. In some embodiments, the MPLS/SR-MPLS network 220 can support an EVPN overlay. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an autonomous system may be a collection of connected Internet Protocol (IP) routing network devices 232 under the control of one or more network operators that presents a common, clearly defined routing policy to a network (e.g., the Internet). Usually, an autonomous system comprises network devices 232 that are established on the edge of the system, and that serve as the system's ingress and egress points for network traffic. Moreover, the network devices 232 may be considered edge network devices, border routers, or core network devices within the respective autonomous system. These network devices typically, but not always, are routers or any other element of network infrastructure suitable for switching or forwarding data packets according to a routing protocol or switching protocol. For the purposes of the present disclosure, the network devices 232 located within an autonomous system may alternatively be referred to as "forwarding network devices" or "intermediate network devices." Moreover, for illustration purposes, the ASes (e.g., PEs 212, 214, 216, 218, and MPLS/SR-MPLS network 220) are shown with a limited number of network devices 232. In an actual implementation, however, an autonomous system normally includes numerous routers, switches, and other elements.

Each AS (e.g., PEs 212, 214, 216, 218, and MPLS/SR-MPLS network 220) may be associated with an Internet Service provider (ISP). Even though there may be multiple autonomous systems supported by a single ISP, the Internet only sees the routing policy of the ISP. That ISP has an officially registered Autonomous System Number (ASN). As such, a unique ASN is allocated to each autonomous system for use in BGP routing. ASNs are important primarily because they uniquely identify each network on the Internet.

To facilitate the routing of network traffic through the autonomous systems, or more specifically, the network devices 232 within the autonomous systems, the network devices may exchange routing information to various network destinations. As described above, BGP is conventionally used to exchange routing and reachability information among network devices 232 within a single autonomous system or between different autonomous systems. The BGP logic of a router is used by the data collectors to collect BGP autonomous system path information, e.g., the "AS_PATH" attribute, as described further below, from BGP tables of border routers of an autonomous system, to construct paths to prefixes.

To exchange BGP routing information, two BGP hosts (network devices 232), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of autonomous systems, e.g., links 202, may be referred to as an "AS_PATH." The AS_PATH attribute indicates the list of autonomous systems that must be traversed to reach the address destination. For example, as illustrated in FIG. 2, the PE 218 may store an AS_PATH attribute of "212 220 218" where the address destination is the PE 218 (or a particular IP address within PE 218). Here, the AS_PATH attribute indicates that the path to the address destination PE 218 from PE 212 passes through PE 214, and MPLS/SR-MPLS network 220 and to PE 218, in that order.

Although it may be preferable that all network devices 232 in the respective ASes (e.g., PEs 212, 214, 216, 218, and MPLS/SR-MPLS network 220) be configured according to BGP, in a real-world implementation, it may be unlikely that each network device communicates using BGP. Thus, the disclosed embodiments are applicable to scenarios where all network devices 232 in the computer network 200 are configured according to BGP, as well as scenarios where only a subset of the network devices 232 are configured as such.

Moreover, a security extension to the BGP has been developed, referred to as BGPSEC, which provides improved security for BGP routing. BGP does not include mechanisms that allow an autonomous system to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an autonomous system number to a public signature verification key, the corresponding private key of which is held by one or more BGP speakers within this autonomous system. Private keys corresponding to public keys in such certificates can then be used within BGPSEC to enable BGP speakers to sign on behalf of their autonomous system. The certificates thus allow a relying party to verify that a BGPSEC signature was produced by a BGP speaker belonging to a given autonomous system. Thus, a goal of BGPSEC is to use signatures to protect the autonomous system Path attribute of BGP update messages so that a BGP speaker can assess the validity of the autonomous system Path in update messages that it receives. It should be understood, however, that the embodiments for implementing autonomous system Path security disclosed herein are not limited to BGPSEC; certain embodiments may, additionally or alternatively, be applicable to other suitable protocols, including, for example, SoBGP, S-BGP, and PGPBGP, to name just a few.

EVPN (Ethernet Virtual Private Network) is a technology for building virtual private networks (VPNs) using Ethernet Virtual Connections (EVCs) instead of traditional Layer 3 IP VPNs. It allows service providers to offer a wide range of Layer 2 and Layer 3 VPN services to customers over a common infrastructure, using Multiprotocol Label Switching (MPLS) or Virtual Extensible LAN (VXLAN) as the underlying transport technology. Corresponding with various systems and methods discussed herein, the MPLS/SR-MPLS networks (e.g., MPLS/SR-MPLS network 162 of FIG. 1, MPLS/SR-MPLS network 220 of FIG. 2) can operate under EVPN; likewise, the provider edge devices (e.g., PEs 212, 214, 216, 218 of FIG. 2) can communicate with associated sources over individual EVPN instances as discussed herein.

EVPN allows for the creation of a single Layer 2 or Layer 3 VPN domain that can span multiple sites, such as data centers or remote offices. This allows for the creation of a virtual LAN (VLAN) or virtual private wire service (VPWS) that can connect multiple sites together as if they were on the same physical LAN.

EVPN also supports several advanced features such as Virtual Private LAN Service (VPLS), which allows for the creation of a full mesh of Layer 2 VPN connections between multiple sites, and Any-to-Any communication within the VPN. Additionally, EVPN also supports BGP-based auto-discovery and signaling, which simplifies the configuration and management of VPNs.

EVPN is a powerful technology that offers many benefits over traditional IP VPNs. It allows for more efficient use of network resources, better scalability, and more advanced features such as VPLS and Any-to-Any communication. It is an ideal solution for service providers looking to offer advanced VPN services to their customers, as well as for enterprise customers looking to connect multiple sites together over a virtual private network.

For clarity of explanation, in some instances the present technology may be presented as including individual functional blocks including functional blocks comprising devices, device components, steps or routines in a method embodied in software, or combinations of hardware and software.

Source Forwarding in Multicast Networks

Figure 3A:
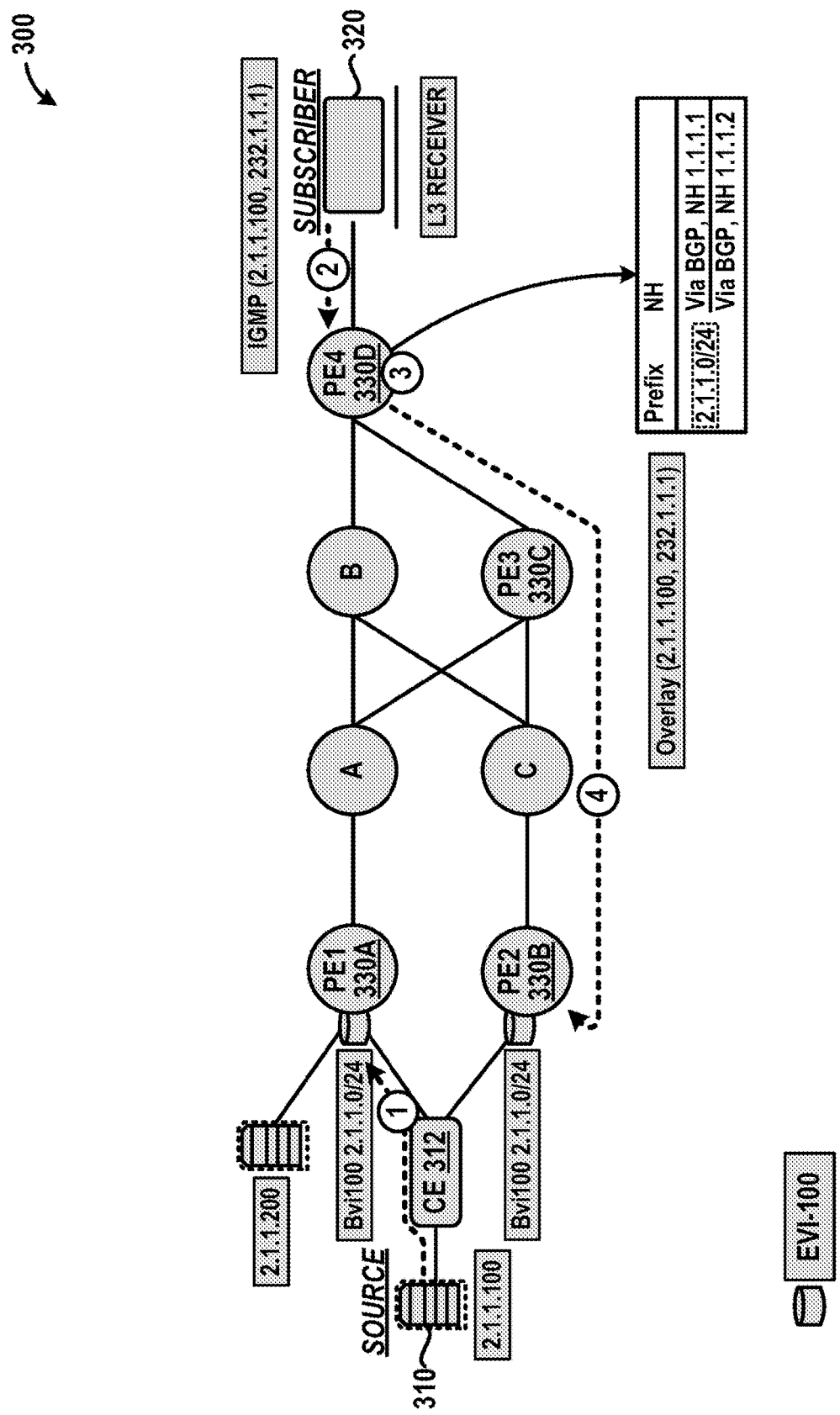
FIG. 3A illustrates a multicast network including a plurality of provider edge devices (PEs) that communicate over EVPN demonstrating a case where an Ingress PE requests multicast content without knowledge of a location of a source in accordance with some aspects of the present technology.

FIG. 3A shows a multicast network 300 having a source 310, a subscriber 320, and a plurality of provider edge devices (PEs), including a first PE (e.g., PE1 330A), a second PE (e.g., PE2 330B), a third PE (e.g., PE3 330C) and a fourth PE (e.g., PE4 330D). PE1 330A and PE2 330B belong to the same EVPN instance (EVI-100). Nodes A, B and C can be intermediate routing nodes between the plurality of PEs.

In this example, the source 310 is behind a customer edge (CE) device 312, which is connected to two different provider edge devices (PEs), PE1 330A and PE2 330B. The CE device 312 may perform a hash procedure to select either PE1 330A or PE2 330B to be an Egress PE for multicast content; in the example, the CE device 312 selects PE1 330A as the Egress PE. At circle (1) in FIG. 3A, the source 310 sends traffic to the CE device 312, which forwards the traffic onward to PE1 330A as the Egress PE.

Continuing with the example, PE4 330D is the Ingress PE for multicast content and is associated with the subscriber 320. The subscriber 320 connects with the source 310 over the multicast network 300 to receive multicast content from the source 310. In particular, PE4 330D sends a "join" message to the Egress PE (PE1 330A) in order to receive multicast content from the source 310. At circle (2) in FIG. 3A, the subscriber 320 sends a "join" message to PE4 330D requesting multicast content from the source 310.

The routing table maintained by PE4 330D indicates to PE4 330D that "1.1.1.1" (associated with PE1 330A) and "1.1.1.2" (associated with PE2 330B) are part of the same EVPN instance where the source 310 is located. However, PE4 330D does not necessarily know which PE is the Egress PE. In the example of FIG. 3A, at circle (3), PE4 330D may select PE2 330B. At circle (4), PE4 330D sends a "join" message to PE2 330B requesting multicast content from the source 310.

While this is a completely valid operation under current policy, this arrangement poses a problem because PE2 330B, does not have the multicast content from the source 310 despite being part of the same EVPN instance. As such, multicast content from the source 310 is unavailable to the subscriber 320 because the subscriber 320 is not connected to the correct Egress PE.

Figure 3B:
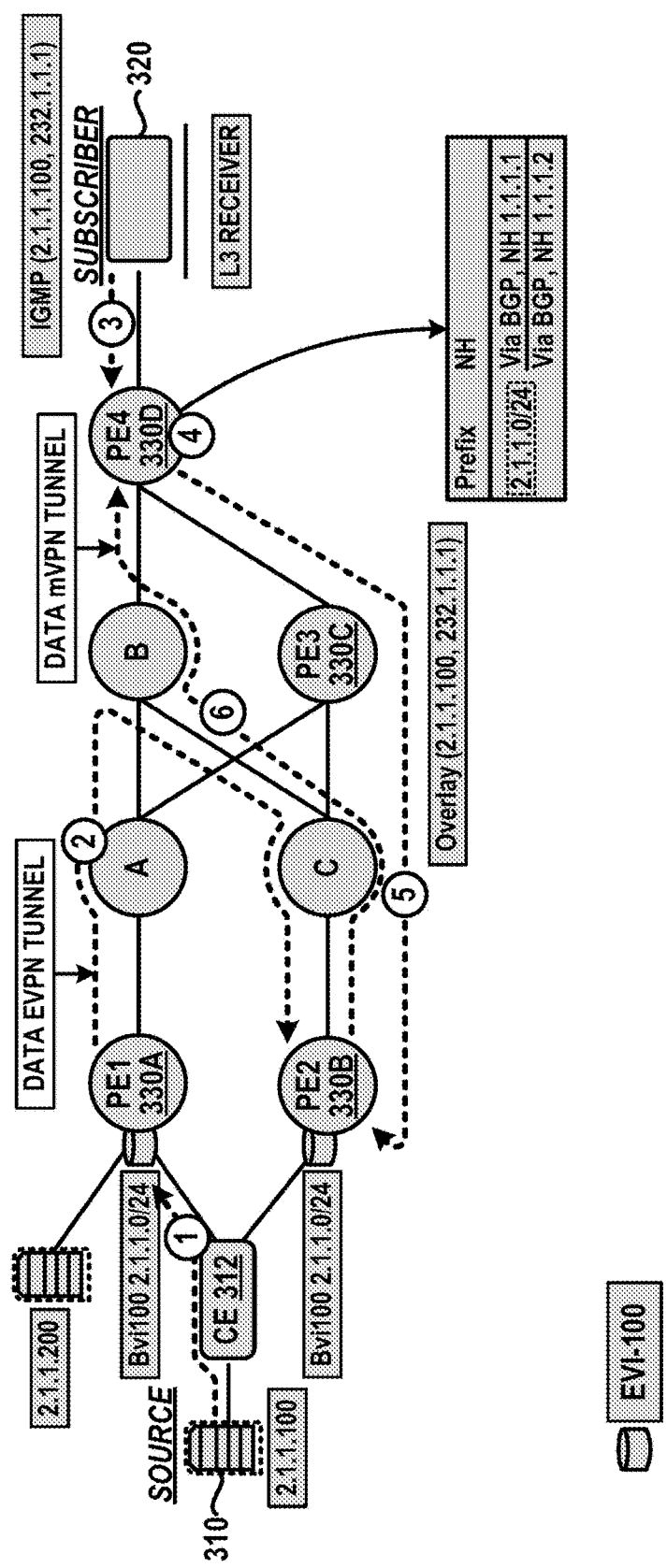
FIG. 3B illustrates a multicast network including a plurality of PEs that communicate over EVPN showing a non-preferred source forwarding solution for the case shown in FIG. 3A in accordance with some aspects of the present technology.

FIG. 3B illustrates one non-preferred solution to this problem in which the Egress PE forwards the multicast content to all connected "peers" within the same EVPN instance including the PE that the Ingress PE is connected to, which can then forward the multicast content onward to the subscriber.

At circle (1) of FIG. 3B, PE1 330A will receive traffic from the source 310. At circle (2) of FIG. 3B, PE1 330A will forward the traffic to PE2 330B over a data EVPN tunnel as "Layer 2" traffic so that any subscriber connected to PE2 330B instead of PE1 330A can also receive the traffic; as shown, this route can require the traffic to pass through one or more intermediate nodes and through a physical cable. At circle (3), the subscriber 320 sends a "join" message to PE4 330D requesting multicast content from the source 310. At circle (4), PE4 330D selects PE2 330B to connect to. At circle (5), PE4 330D sends the "join" message to PE2 330B.

Upon establishing communication with PE2 330B, and upon receiving the multicast content from PE1 330A as Layer 2 traffic, at circle (6) of FIG. 3B, PE2 330B sends the multicast content onward to PE4 330D over a data mVPN tunnel as "Layer 3" traffic. However, this arrangement can have adverse effects by flooding the multicast network 300 by requiring extra bandwidth to send multiple copies of the same multicast content. This problem scales when more PEs are included within the same EVPN instance; for example, if PE3 330C were also included as a potential egress PE for the source 310 along with PE2 330B, then PE1 330A would forward multicast content to both PE2 330B and PE3 330C over the Layer 2 data EVPN tunnel.

Source Forwarding in Multicast Networks:
Preferred Solution a. VRF-Enabled PE

Figure 4:
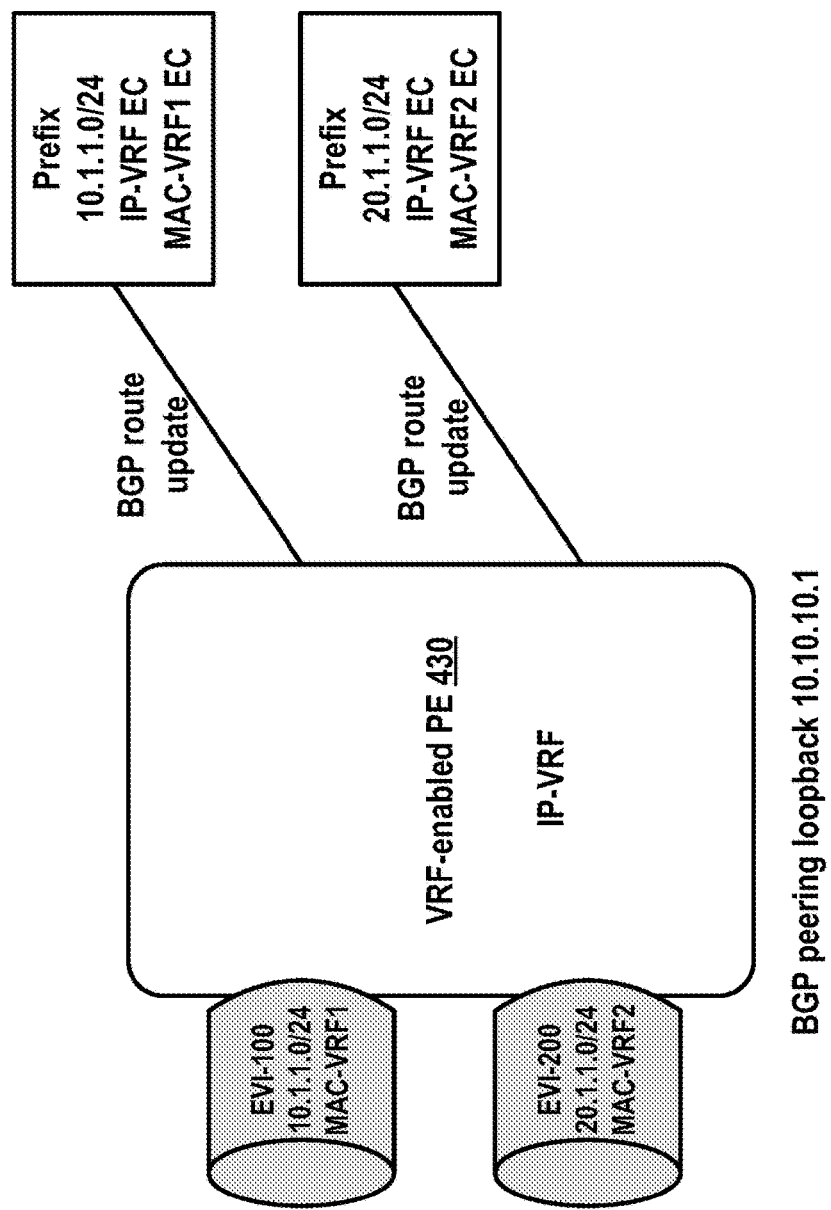
FIG. 4 illustrates a Virtual Routing and Forwarding (VRF)-enabled PE having multiple bridge domains associated with multiple EVPN instances in accordance with some aspects of the present technology.
Figure 5A:
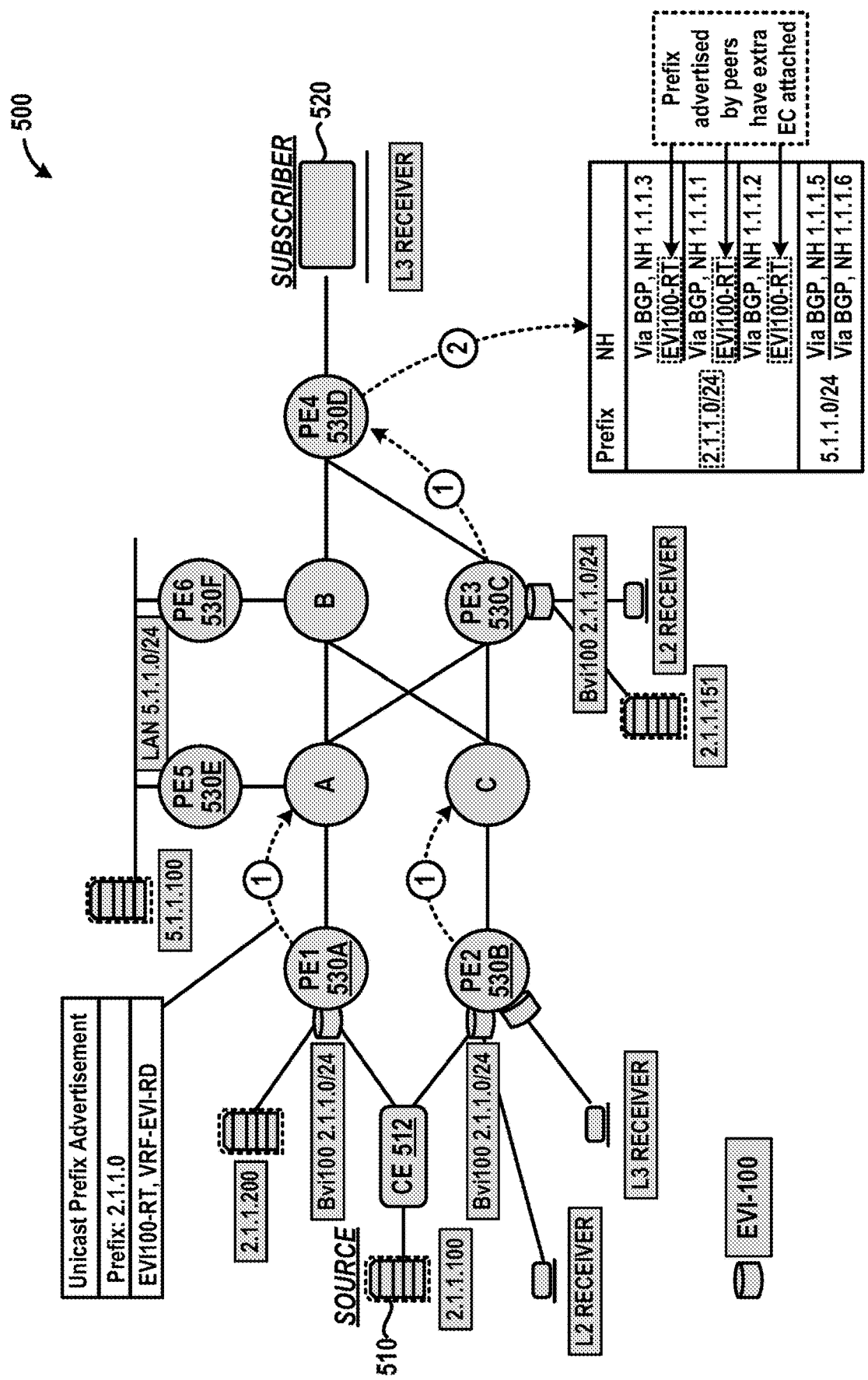
FIG. 5A illustrates a multicast network including a plurality of PEs that communicate over EVPN, where PEs belonging to the same EVPN instance advertise prefixes/locations and to other nodes within the multicast network and inform the other nodes that the PEs belong to the same EVPN instance in accordance with some aspects of the present technology.

FIG. 4 shows a diagram 400 where a Virtual Routing and Forwarding (VRF)-enabled PE 430 has multiple bridge domains, including a first bridge domain associated with a first EVPN instance (EVI-100) and a second bridge domain associated with a second EVPN instance (EVI-200). Each bridge domain can also be represented by an Integrated Routing and Bridging (IRB) interface for layer-3 connectivity. As shown, for Border Gateway Protocol (BGP) route updates, the PE 430 can advertise reachability along with the associated prefixes for each bridge domain; in this example, the PE 430 can use IP-VRF (Virtual Routing and Forwarding for Internet Protocol) extended community route information and MAC-VRF (Virtual Routing and Forwarding for Media Access Control) extended community route information. IP-VRF Route Import has been used traditionally to ensure that join requests are targeted to only an associated Upstream Multicast Hop (UMH). However, to address the problems outlined above with respect to FIGS. 3A and 3B, it is desirable for the join request to reach and be accepted by each PE (e.g, PE 430) where a MAC-VRF (associated with the EVPN instance) is present.

b. Multicast Network Topology, Source Forwarding Solution Setup and Normal Operation FIGS. 5A-5H illustrate a solution to the problems outlined above with respect to FIGS. 3A and 3B. FIG. 5A shows a multicast network 500 having a source 510, a subscriber 520, and a plurality of provider edge devices (PEs), including a first PE (e.g., PE1 530A), a second PE (e.g., PE2 530B), a third PE (e.g., PE3 530C) and a fourth PE (e.g., PE4 530D). In this example, PE1 530A, PE2 530B and PE3 530C belong to the same EVPN instance (EVI-100). The multicast network 500 can also connect to a local area network (LAN), which can include a fifth PE (e.g., PE5 530E) and a sixth PE (e.g., PE6 530F) as illustrated. Nodes A, B and C can be intermediate routing nodes between respective PEs.

In FIG. 5A, at circle (1), the PEs (e.g., PE1 530A, PE2 530B and PE3 530C) that belong to the same EVPN instance (EVI-100) generate and send Unicast Prefix Advertisements that advertise their prefixes/locations to other nodes within the multicast network 500. Importantly, the prefix advertisements sent by each respective PE of the same EVPN instance (EVI-100) includes additional "Extended Community" (EC) information that tells the other nodes in the network 500 that the associated PE is part of an EVPN instance. As such, in the example, PE1 530A, PE2 530B and PE3 530C advertise their prefixes along with the EC information that informs the multicast network 500 that PE1 530A, PE2 530B and PE3 530C belong to EVI-100.

At circle (2), the Ingress PE (e.g., PE4 530D) receives the Unicast Prefix Advertisements and updates its routing table accordingly. As shown, at the end of this step, the routing table maintained by PE4 530D shows "1.1.1.1" (associated with PE1 530A), "1.1.1.2" (associated with PE2 530B) and "1.1.1.3" (associated with PE3 530C) are part of the same EVPN instance where the source 510 is located, with the EC information attached. The routing table maintained by PE4 530D also shows "1.1.1.5" and "1.1.1.6" respectively representing PE5 530E and PE6 530F of the LAN.

Figure 5B:
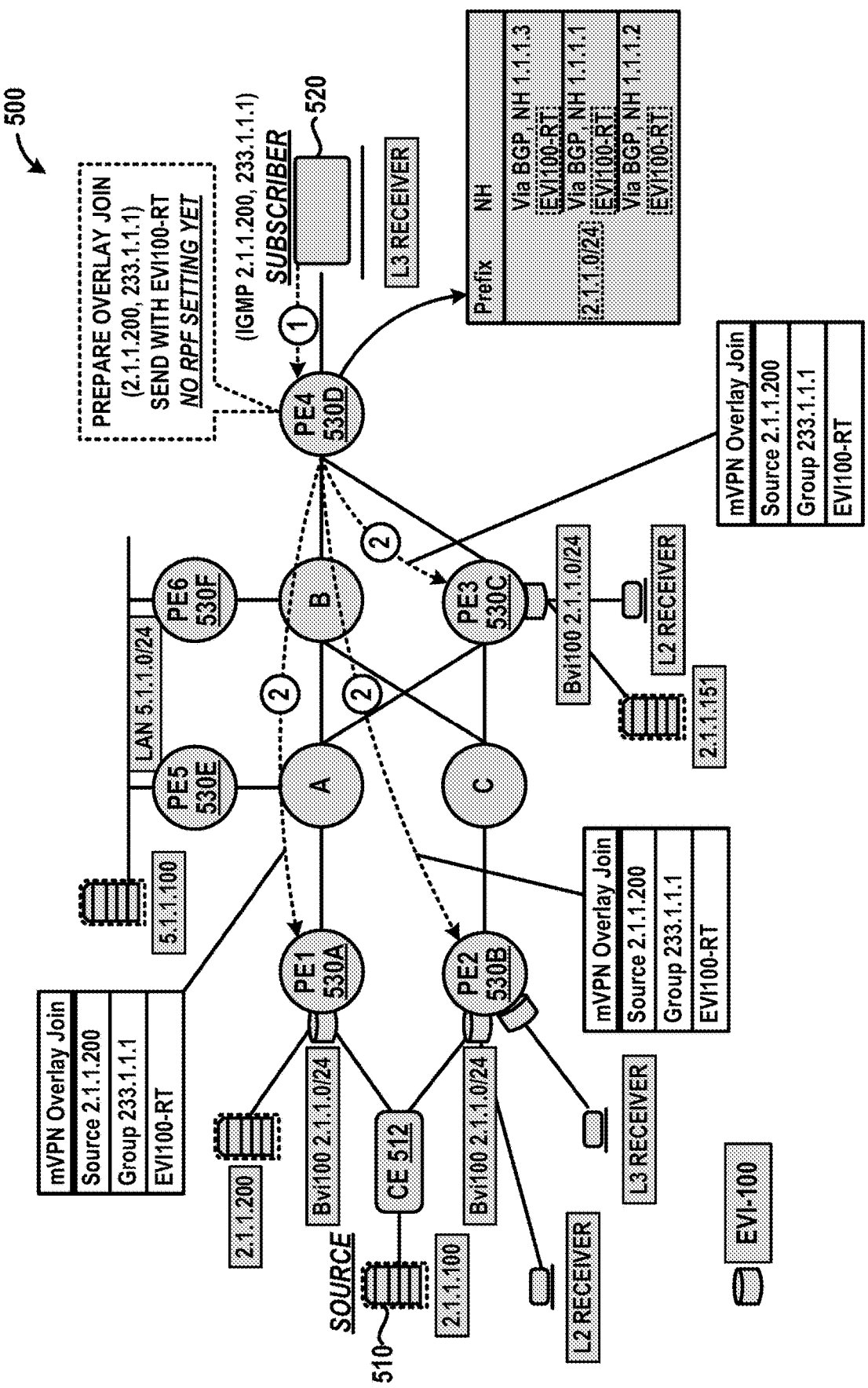
FIG. 5B illustrates the multicast network of FIG. 5A where an Ingress PE sends a join request message to the PEs belonging to the same EVPN instance on behalf of a subscriber in accordance with some aspects of the present technology.

In FIG. 5B, the Ingress PE (e.g., PE4 530D) prepares to establish a session with the source 510 associated with EVI-100. At circle (1) of FIG. 5B, the subscriber 520 sends a join request message to PE4 530D, which checks its routing table including the EC information to see which PEs are associated with EVI-100. At circle (2), PE4 530D sends mVPN overlay join request messages to PE1 530A, PE2 530B and PE3 530C associated with EVI-100. These join request messages are received at PE1 530A, PE2 530B and PE3 530C as shown. Importantly, no reverse path forwarding (RPF) tunnel is established at this step between the Egress PE and Ingress PE, because the Ingress PE (PE4 530D) does not know yet which PE associated with EVI-100 will be the Egress PE.

Figure 5C:
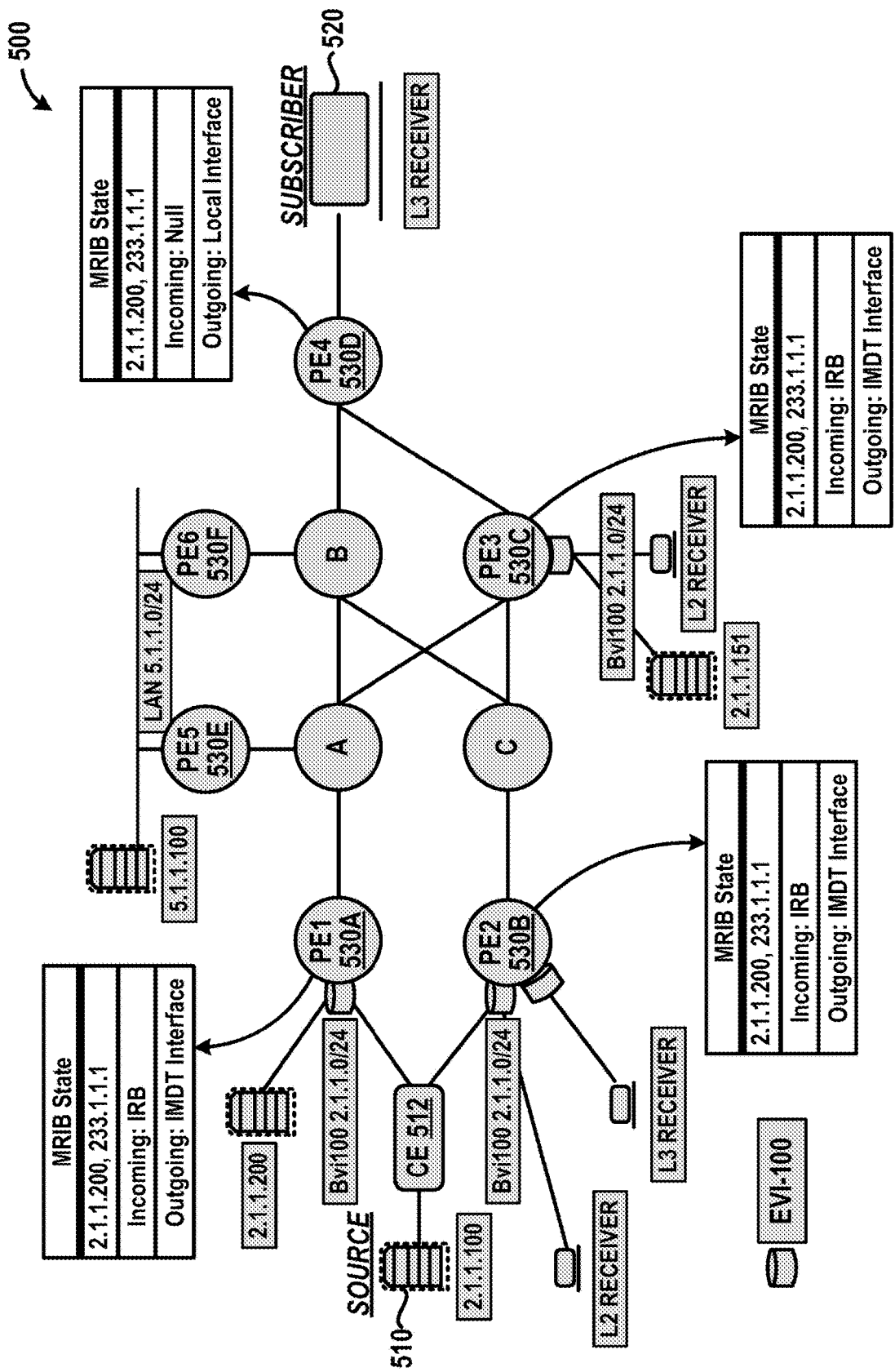
FIG. 5C illustrates Multicast Routing Information Base (MRIB) states for the PEs of FIG. 5B following receipt of the join request messages in accordance with some aspects of the present technology.

FIG. 5C shows Multicast Routing Information Base (MRIB) states for the PEs following receipt of the join request messages at PE1 530A, PE2 530B and PE3 530C. As shown, PE1 530A, PE2 530B and PE3 530C have "incoming" interfaces set to IRB and "outgoing" interfaces set to IMDT interface. PE4 530D shows incoming interface set to "null" and outgoing interface set to "Local interface".

Figure 5D:
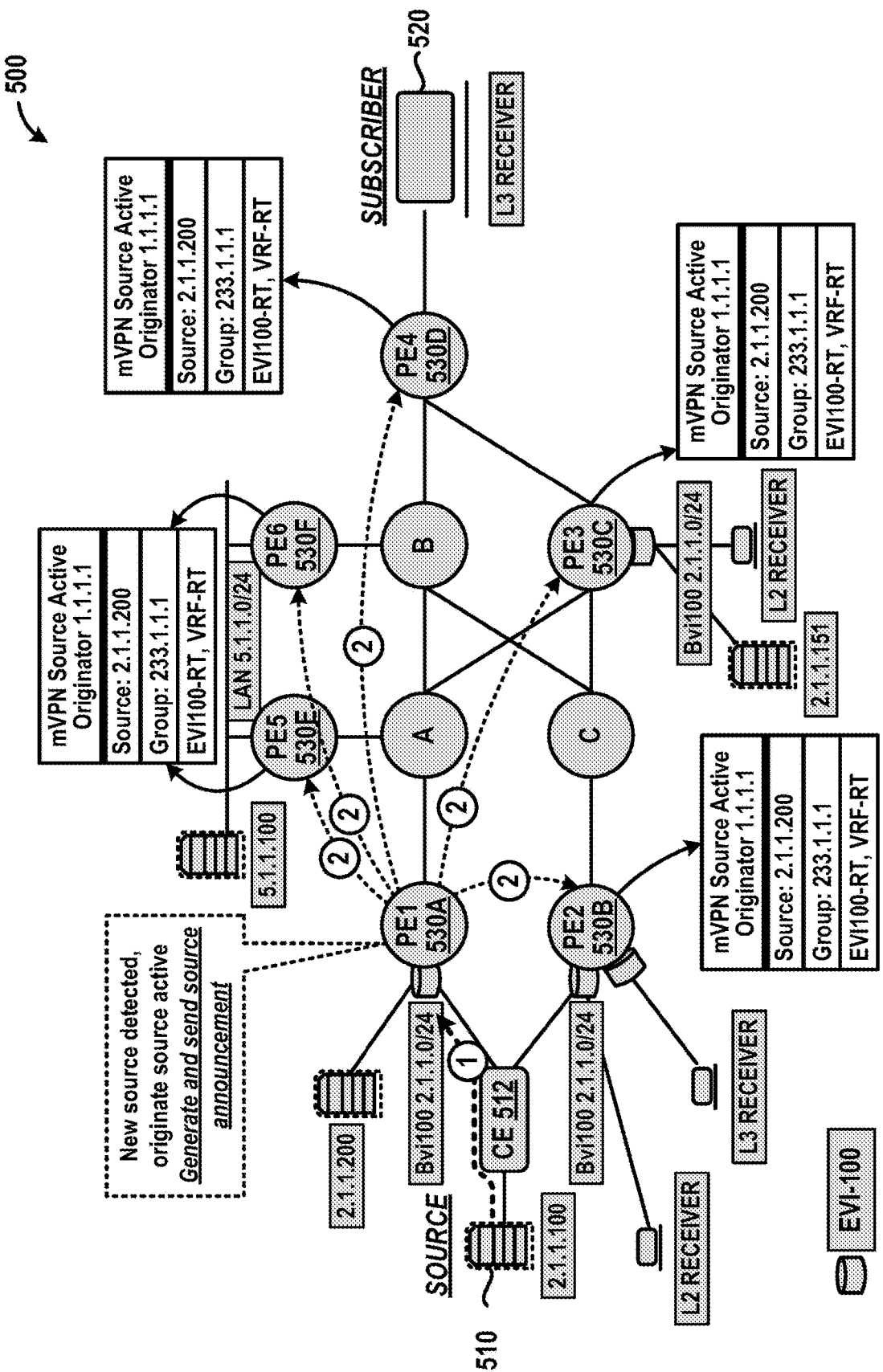
FIG. 5D illustrates the multicast network of FIG. 5C following designation of an Egress PE and subsequent communication of a source announcement for the Egress PE in accordance with some aspects of the present technology.

In FIG. 5D, at circle (1), the source 510 sends multicast content to CE device 512, which can select an Egress PE for forwarding content from the source 510 to the Ingress PE. In the example, the CE device 512 designates PE1 530A as the Egress PE as shown. Once PE1 530A recognizes that it has been selected as the Egress PE, at circle (2) of FIG. 5D, PE1 530A generates and sends Source Announcements to other PEs in the multicast network 500 (including PE4 530D as the Ingress PE, but also including PE2 530B and PE3 530C that belong to EVI-100) with information that the source 510 is using PE1 530A as the Egress PE. Importantly, the Source Announcements include both IP-VRF (Virtual Routing and Forwarding for Internet Protocol) EC info and MAC-VRF (Virtual Routing and Forwarding for Media Access Control) EC info, which will be used at the other PEs in the multicast network 500 for different purposes. FIG. 5D also shows the other PEs in the multicast network 500 receiving information about the location of the source 510 (mVPN Source Active Originator 1.1.1.1).

Figure 5E:
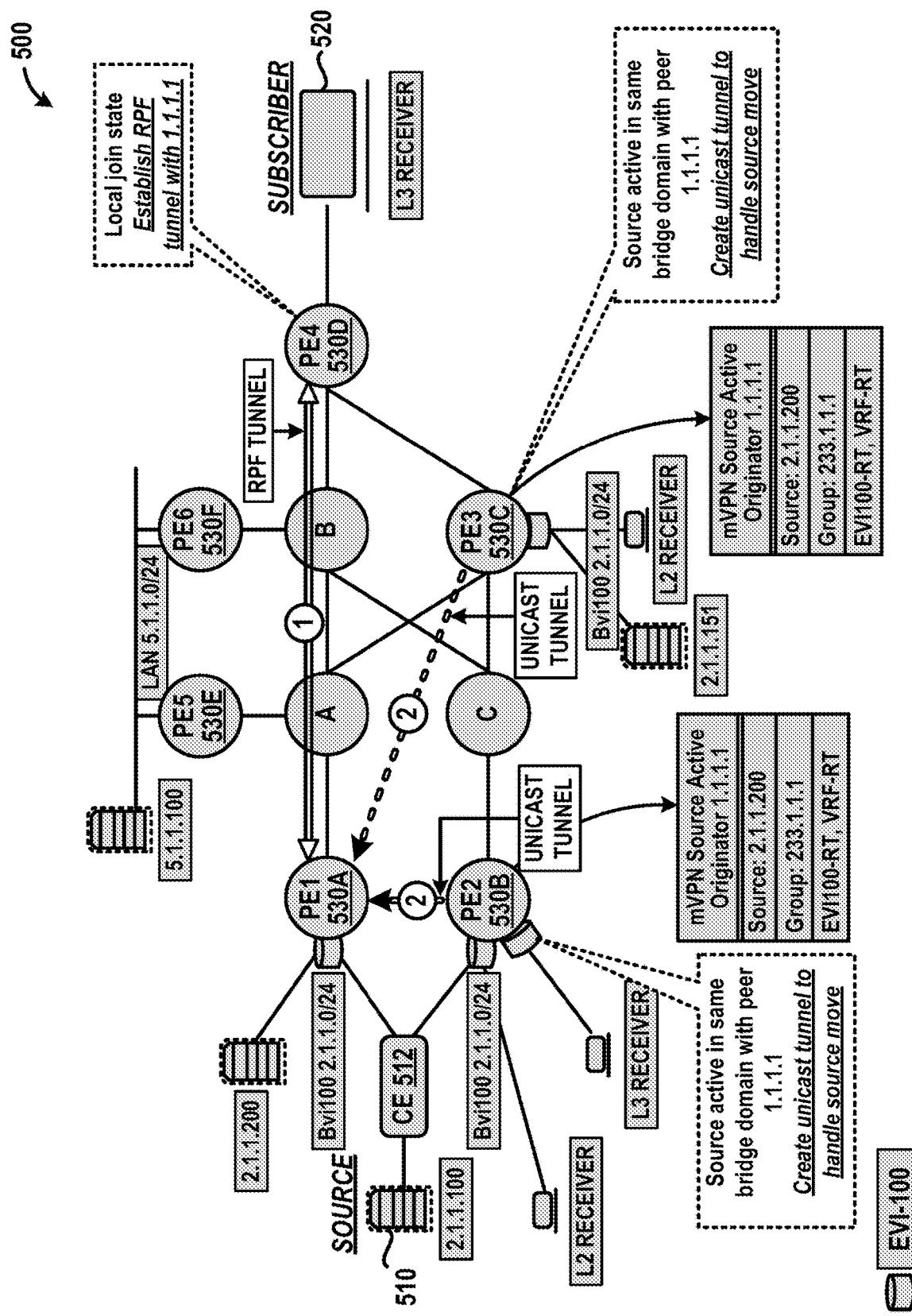
FIG. 5E illustrates the multicast network of FIG. 5D where a reverse path forwarding tunnel is established between the Ingress PE and the Egress PE, and where unicast tunnels are established between the Egress PE and one or more Backup PEs in accordance with some aspects of the present technology.

In FIG. 5E, PE4 530D (as the Ingress PE), PE2 530B and PE3 530C are now aware that PE1 530A has been selected as the Egress PE. At circle (1), PE4 530D establishes an RPF tunnel with PE1 530A using the IP-VRF EC info from the Source Announcement; multicast content from the source 510 can be sent to the subscriber 520 over the RPF tunnel.

At this step, PE2 530B and PE3 530C can each be considered a "Backup PE". At circle (2) of FIG. 5E, PE2 530B establishes a unicast tunnel (e.g., a "Broadcast, unknown-unicast and multicast" (BUM) tunnel) from PE2 530B to PE1 530A using the MAC-VRF EC info; PE3 530C also establishes a unicast tunnel from PE3 530C to PE1 530A using the MAC-VRF EC info. In case PE1 530A stops being the Egress PE, the unicast tunnels from PE2 530B to PE1 530A or from PE3 530C to PE1 530A can be used to temporarily forward multicast content to PE1 530A so that PE4 530D can still receive multicast content over the same RPF tunnel if the source 510 stops sending multicast content from PE1 530A and instead starts sending multicast content from PE2 530B or PE3 530C.

Figure 5F:
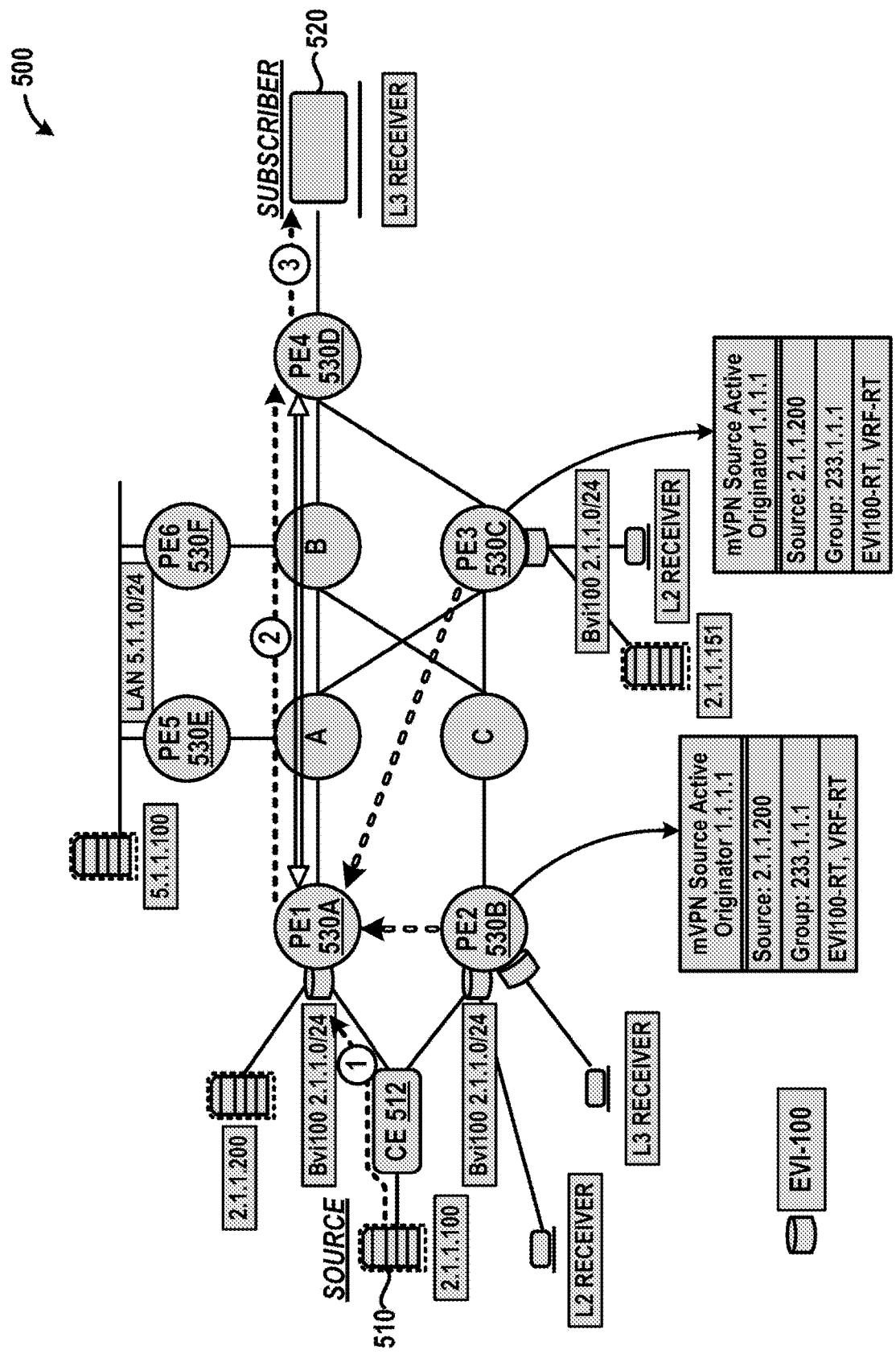
FIG. 5F illustrates the multicast network of FIG. 5E where the Egress PE forwards multicast content from the source to the Ingress PE over the reverse path forwarding tunnel in accordance with some aspects of the present technology.
Figure 5G:
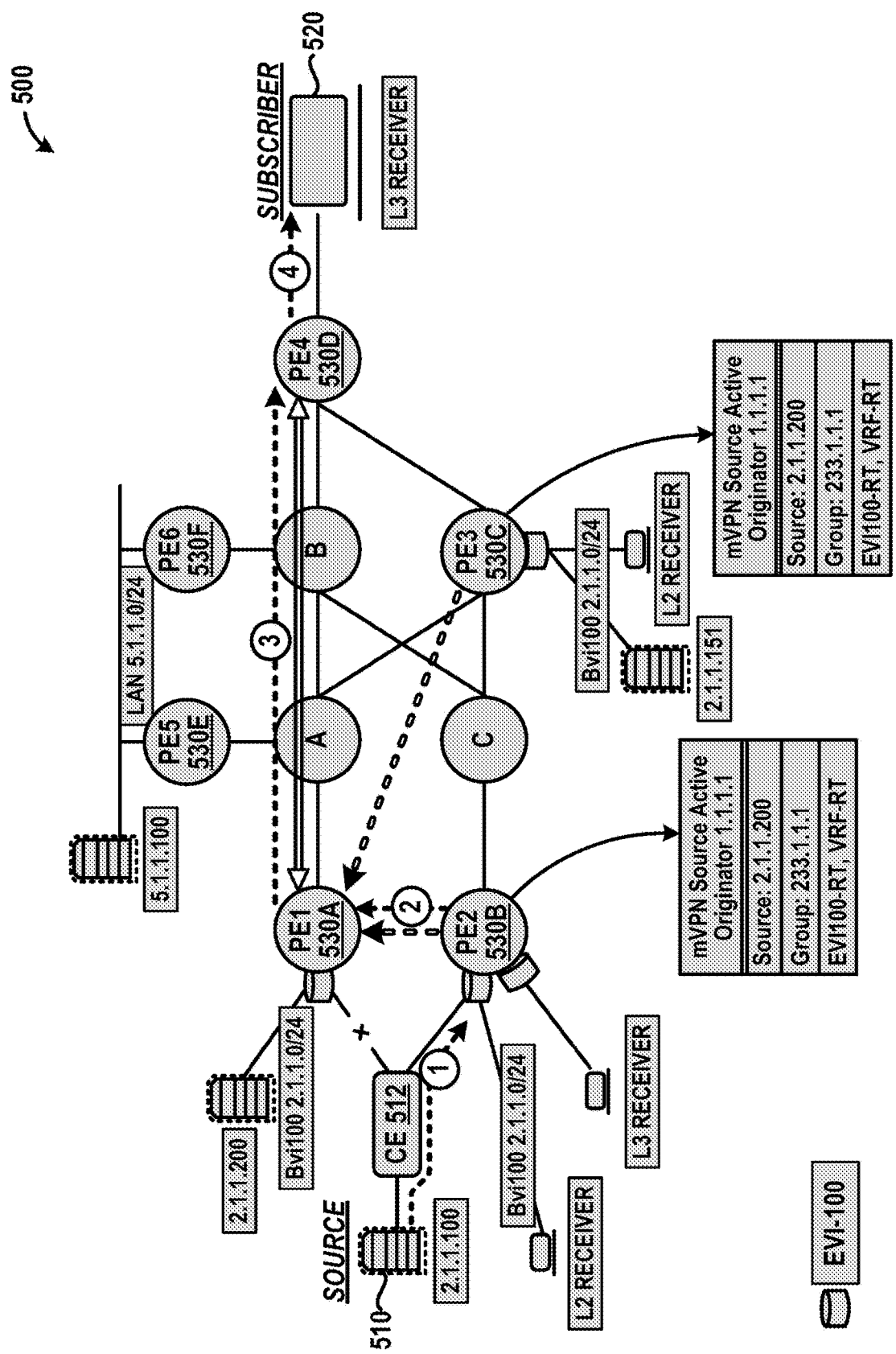
FIG. 5G illustrates the multicast network of FIG. 5F where the Egress PE of FIG. 5F is no longer functioning as the Egress PE-one of the Backup PEs temporarily receives multicast content from the source and forwards the multicast content onward to the Egress PE over the associated unicast tunnel, which in turn forwards the multicast content onward to the Ingress PE over the reverse path forwarding tunnel in accordance with some aspects of the present technology.

FIG. 5F shows the multicast network 500 following establishment of the RPF tunnel from the Egress PE (e.g., PE1 530A) to the Ingress PE (e.g., PE4 530D). As shown, at circle (1), the source 510 sends multicast content to the CE device 512, which forwards the multicast content onward to PE1 530A. At circle (2), PE1 530A forwards the multicast content to PE4 530D over the RPF tunnel. At circle (3), PE4 530D sends the multicast content to the subscriber 520. While the functionalities outlined with respect to circles (1), (2) and (3) of FIG. 5F are being performed, Backup PEs PE2 530B and PE3 530C remain on "standby" to take over if necessary.

c. Source Forwarding Solution—Accommodating Source Move or Ethernet Segment Failure FIG. 5G shows the multicast network 500 when the source 510 stops sending multicast content to PE1 530A, such that PE1 530A is no longer functioning as an Egress PE. This can happen if the source 510 is "Multi-Homing" and simply moves to another PE associated with EVI-100 (such as PE2 530B), or can happen if an Ethernet Segment (ES) connecting the CE device 512 and PE1 530A fails. If the original Egress PE is no longer the Egress PE, then one of the Backup PEs can take its place. In this example, the source 510 can stop using PE1 530A and start using PE2 530B as the Egress PE as shown; at circle (1), the source 510 and CE device 512 start sending traffic to PE2 530B as the Egress PE. However, the Ingress PE PE4 530D may be unaware that PE1 530A is no longer the Egress PE, and will continue to look for traffic over the RPF tunnel between PE1 530A and PE4 530D.

At circle (2), the new Egress PE (e.g., PE2 530B) receives the multicast content meant for the subscriber, and sends the multicast content onward to the old Egress PE (PE1 530A) over the unicast tunnel previously established therebetween (e.g., between PE2 530B and PE1 530A). At circle (3), PE1 530A forwards the multicast content onward to PE4 530D over the RPF tunnel previously established between PE1 530A and PE4 530D. At circle (4), PE4 530D forwards the multicast content to the subscriber 520. In examples where the source 510 and CE device 512 start sending traffic to PE3 530C as the new Egress PE (instead of PE2 530B), the same functionalities discussed above with respect to circles (2)-(4) of FIG. 5G can be applied; in this case, PE3 530C forwards the multicast content to PE1 530A over the unicast tunnel previously established between PE3 530C and PE1 530A.

The arrangement shown in FIG. 5G temporarily uses one of the Backup PEs (e.g., PE2 530B) to forward multicast content to the old Egress PE (e.g., PE1 530A) so that the Ingress PE (e.g., PE4 530D) can still receive multicast content from the source 510 over the old RPF tunnel while the multicast network 500 adjusts to accommodate the new Egress PE.

Figure 5H:
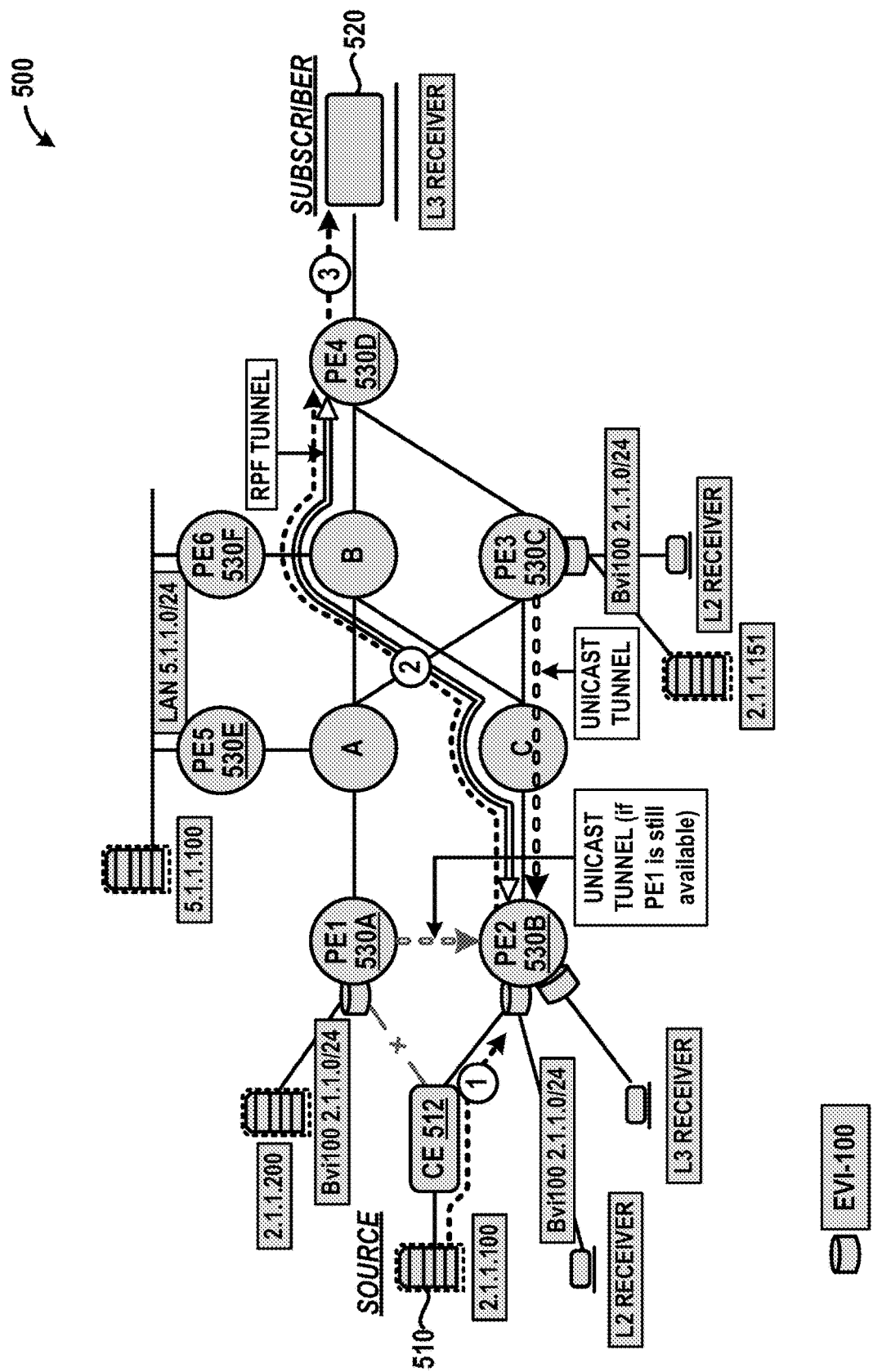
FIG. 5H illustrates the multicast network of FIG. 5G following adjustment of the multicast network, such that the Backup PE of FIG. 5G is now designated as a new Egress PE and a new reverse path forwarding tunnel is established between the new Egress PE and the Ingress PE for communication of multicast content-another PE belonging to the same EVPN instance is designated as a Backup PE for the new Egress PE and a unicast tunnel is established therebetween in accordance with some aspects of the present technology.

FIG. 5H shows the multicast network 500 adjusted to accommodate the new Egress PE (e.g., PE2 530B). One or more functionalities outlined in FIGS. 5A-5E can be applied to announce and propagate selection of the new Egress PE throughout the multicast network 500 while the Ingress PE (e.g., PE4 530D) continues to receive multicast content over the old RPF tunnel. After PE2 530B announces itself as the new Egress PE and sends a new Source Announcement with IP-VRF EC info and MAC-VRF EC info, PE4 530D establishes a new RPF tunnel between PE4 530D and PE2 530B to receive multicast content from the source 510.

PE3 530B can become a Backup PE for PE2 530B, and can establish a Unicast/BUM tunnel from PE3 530B to PE2 530B. In cases where the old Egress PE (e.g., PE1 530A) is still available to communicate with the source 510 (e.g., source move with no EC failure, or if a failed EC is re-established), the old Egress PE can also become a Backup PE and can establish a Unicast/BUM tunnel to the new Egress PE (e.g., PE2 530B).

As shown, at circle (1), the source 510 and CE device 512 send the multicast content to PE2 530B as the new Egress PE. At circle (2), PE2 530B forwards the multicast content onward to PE4 530D over the RPF tunnel as shown. At circle (3), PE4 530D sends the multicast content onward to the subscriber 520. In the meantime, while the functionalities outlined with respect to circles (1), (2) and (3) are being performed, Backup PE PE3 530C (and PE1 530A, if still available) remains on "standby" to take over if necessary.

Methods

Figure 6A:
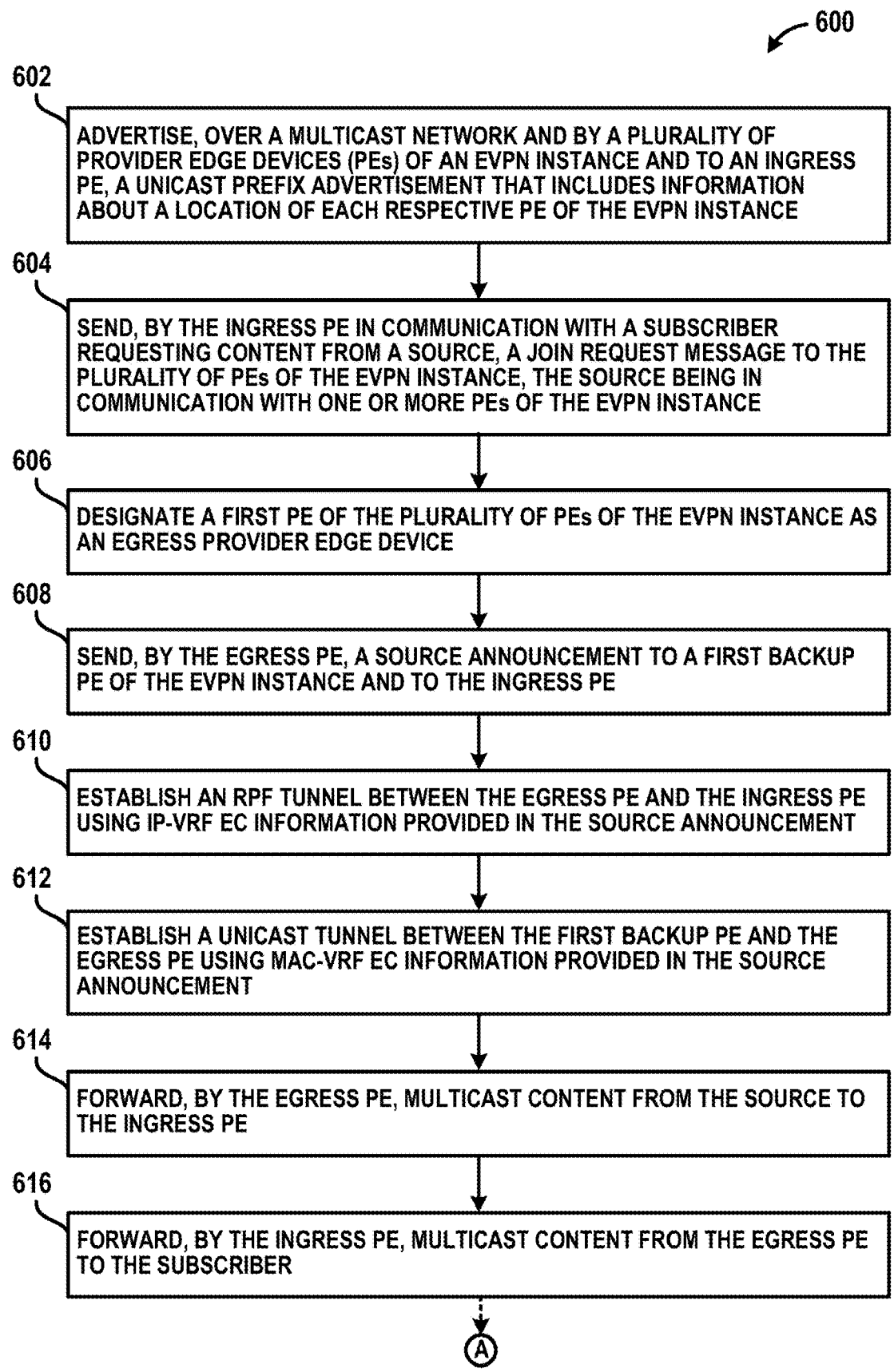
FIGS. 6A and 6B collectively illustrate a method for managing multicast flows for preferred source forwarding through a multicast network in accordance with some aspects of the present technology.
Figure 6B:
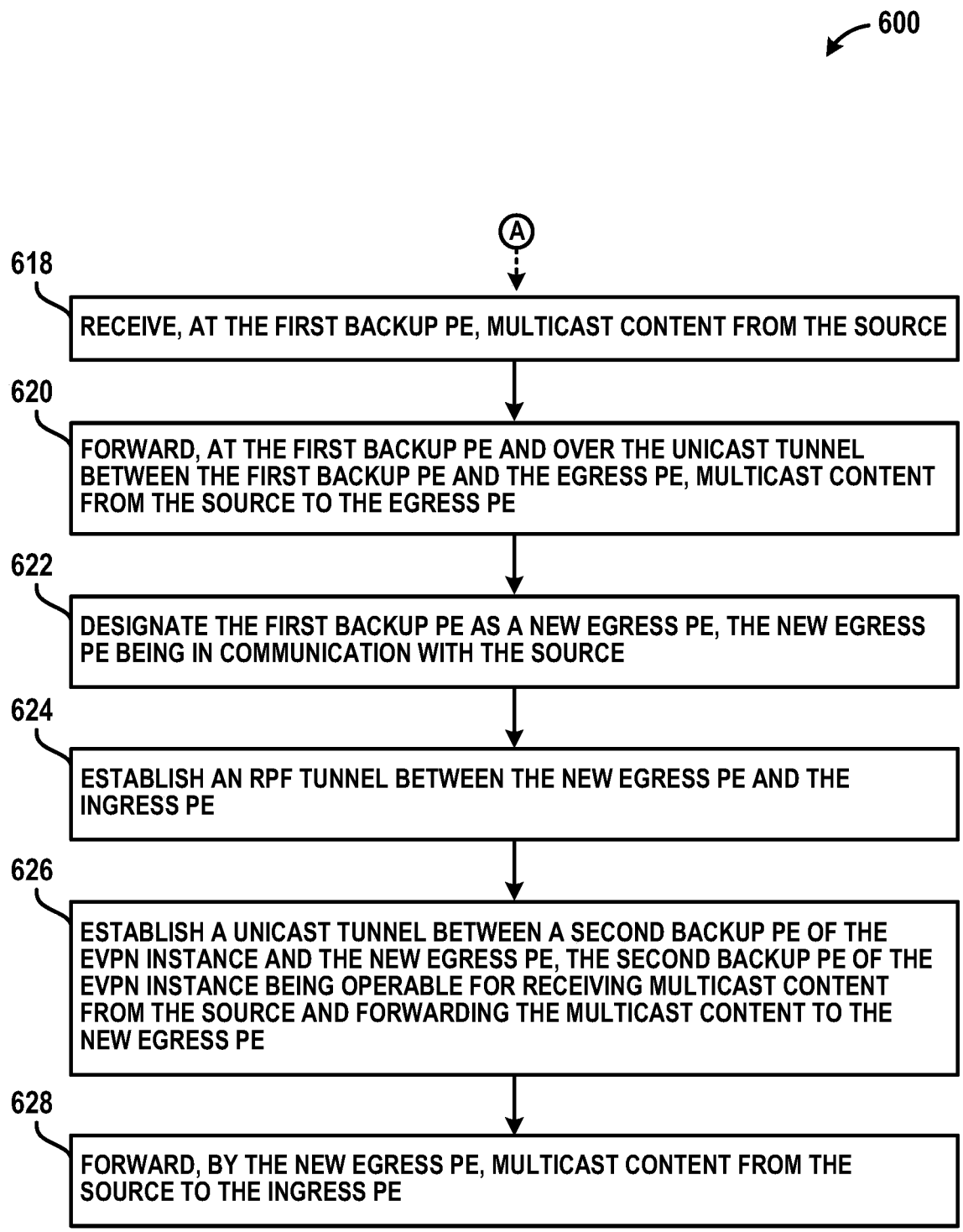

FIGS. 6A and 6B are a series of process flow diagrams showing a method 600 for establishing a multicast connection and forwarding multicast content from a source to a subscriber.

FIG. 6A shows steps of method 600 that can be applied during setup and normal operation of the system of FIGS. 5A-5H. Step 602 of method 600 includes advertising, over a multicast network and by a plurality of provider edge devices (abbreviated in FIGS. 6A and 6B as "PEs") of an Ethernet Virtual Private Network (EVPN) instance and to an ingress provider edge device, a Unicast Prefix Advertisement that includes information about a location of each respective provider edge device of the EVPN instance. Step 602 of method 600 corresponds with functionalities illustrated in FIG. 5A. Step 604 of method 600 follows step 602 and includes sending, by the ingress provider edge device in communication with a subscriber requesting content from a source over a multicast network, a join request message to a plurality of provider edge devices of the EVPN instance, the source being in communication with one or more provider edge devices of the EVPN instance. Step 604 of method 600 corresponds with functionalities illustrated in FIG. 5B.

Step 606 of method 600 includes designating a first provider edge device of the plurality of provider edge devices of the EVPN instance as an egress provider edge device. Step 608 of method 600 follows step 606 and includes sending, by the egress provider edge device, a source announcement to a first backup provider edge device of the EVPN instance and to the ingress provider edge device. Importantly, the source announcement includes both IP-VRF EC information and MAC-VRF EC information that are used for different purposes by two or more provider edge devices that receive the source announcement. Steps 606 and 608 of method 600 correspond with functionalities illustrated in FIG. 5D.

Step 610 of method 600 includes establishing a reverse path forwarding (abbreviated in FIGS. 6A and 6B as "RPF") tunnel between the egress provider edge device and the ingress provider edge device using IP-VRF EC information provided in the source announcement. Step 612 of method 600 includes establishing a unicast tunnel between the first backup provider edge device and the egress provider edge device using MAC-VRF EC information provided in the source announcement. Steps 610 and 612 can be applied simultaneously. Steps 610 and 612 of method 600 correspond with functionalities illustrated in FIG. 5E.

Following the establishment of the reverse path forwarding tunnel, step 614 of method 600 includes forwarding, by the egress provider edge device, multicast content from the source to the ingress provider edge device. Step 616 of method 600 includes forwarding, by the ingress provider edge device, multicast content from the egress provider edge device to the subscriber. Steps 614 and 616 can be repeated as needed to provide multicast content from the source to the subscriber through the egress provider edge device, as long as the egress provider edge device continues to function as the egress provider edge device. Steps 614 and 616 of method 600 correspond with functionalities illustrated in FIG. 5F. FIG. 6A concludes at circle A.

FIG. 6B starts at circle A of FIG. 6B, and shows steps of method 600 that can be applied following a source move or ethernet segment failure of the system of FIGS. 5A-5H. In this scenario, the source can start sending multicast content to the first backup provider edge device instead of the (previous) egress provider edge device. however, the ingress provider edge device does not know that the source is no longer sending the multicast content to the (previous) egress provider edge device, so it will continue to "look" for multicast content from the (previous) egress provider edge device. To resolve this problem, the first backup provider edge device forwards multicast content to the (previous) egress provider edge device over the unicast tunnel (previously established at step 612 of FIG. 6A), which can forward the multicast content onward to the ingress provider edge device. This configuration can remain in place as a temporary measure until the multicast network adjusts to recognize and establish the first backup provider edge device as a new egress provider edge device.

Step 618 of method 600 includes receiving, at the first backup provider edge device, multicast content from the source. Step 618 can be applied in cases where the (previous) egress provider edge device selected at step 606 shown in FIG. 6A is no longer receiving multicast content from the source and the first backup provider edge device takes over to coordinate communication of multicast content between the source and the subscriber. Step 620 of method 600 includes forwarding, at the first backup provider edge device and over the unicast tunnel between the first backup provider edge device and the egress provider edge device (e.g., the unicast tunnel established at step 612 of FIG. 6A), multicast content from the source to the egress provider edge device. Following step 620, the egress provider edge device can then forward the multicast content received from the first backup provider edge device to the ingress provider edge device over the reverse path forwarding tunnel similar to step 614 of FIG. 6A. The first backup provider edge device and the egress provider edge device can continue to use the unicast tunnel and the reverse path forwarding tunnel to forward content to the ingress provider edge device as a temporary measure until the multicast network adjusts to recognize the first backup provider edge device as a new egress provider edge device. Steps 618-620 of method 600 correspond with functionalities illustrated in FIG. 5G.

Step 622 of method 600 includes designating the first backup provider edge device as a new egress provider edge device, the new egress provider edge device being in communication with the source. Similarly, following step 622, the new egress provider edge device (formerly the first backup provider edge device) can send out a source announcement similar to step 608 to enable the ingress provider edge device to start looking for multicast content from the new egress provider edge device rather than the (previous) egress provider edge device.

Step 624 of method 600 includes establishing a reverse path forwarding tunnel between the new egress provider edge device and the ingress provider edge device. Step 626 of method 600 includes establishing a unicast tunnel between a second backup provider edge device of the EVPN instance and the new egress provider edge device, the second backup provider edge device of the EVPN instance being operable for receiving multicast content from the source and forwarding the multicast content to the new egress provider edge device.

Step 628 of method 600 includes forwarding, by the new egress provider edge device, multicast content from the source to the ingress provider edge device. Following step 628, the ingress provider edge device can apply step 616 shown in FIG. 6A to forward multicast content from the (new) egress provider edge device to the subscriber. Steps 622-628 of method 600 correspond with functionalities illustrated in FIG. 5H. Similarly, the second backup provider edge device is configured to take over and apply steps 618-628 shown in FIG. 6B in case the new egress provider edge device stops functioning as the new egress provider edge device.

Network Device

Figure 7:
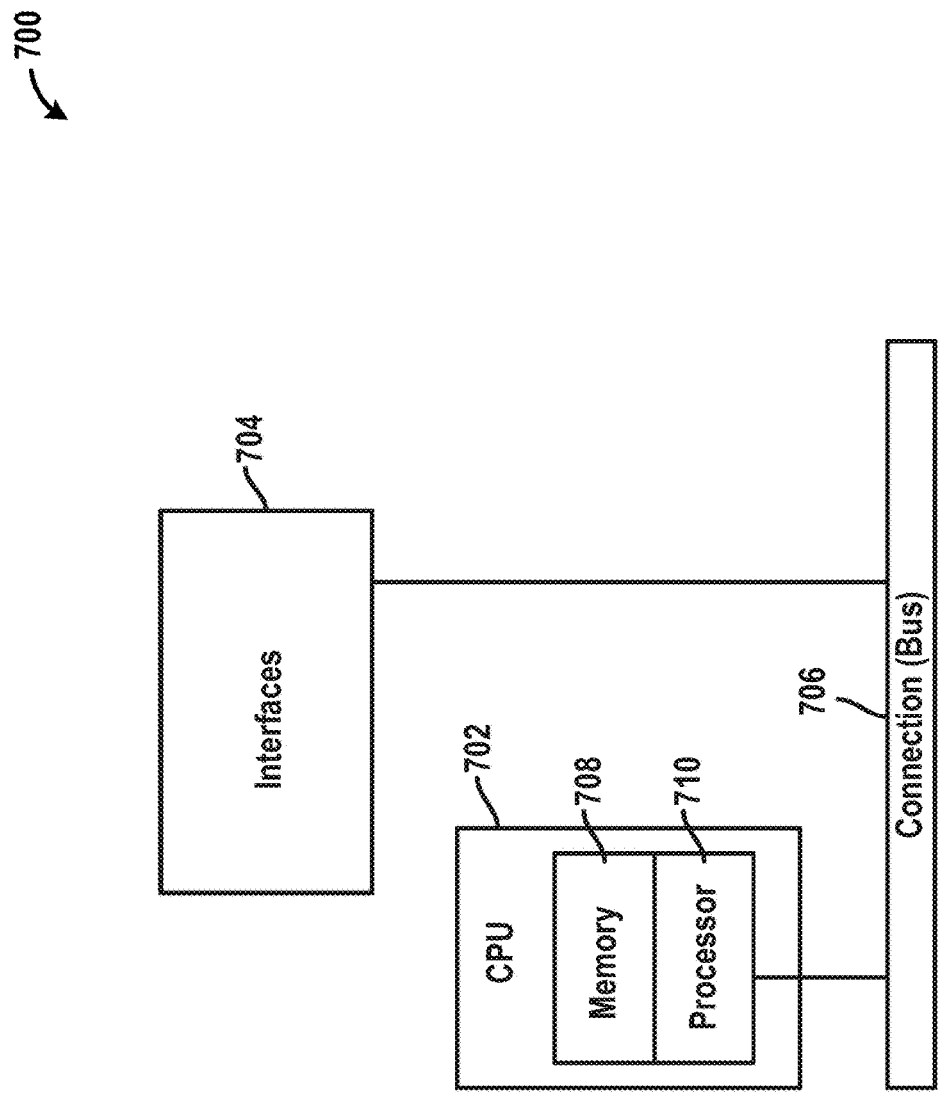
FIG. 7 illustrates an example of a network device in accordance with some aspects of the present technology.

FIG. 7 illustrates an example of a network device, according to some aspects of the present disclosure. Network device 700 can be a network appliance implementing the functionalities of BGP and/or the provider edge devices (e.g., PEs 212, 214, 216, 218 shown in FIG. 2, VRF-enabled PE 430 shown in FIG. 4, PEs 530A-530F shown in FIGS. 5A-5H), among other components described above with reference to FIGS. 1-5H, such as a controller or other device that implements functionalities of the MPLS network or SR-MPLS network (e.g., MPLS network 162 shown in FIG. 1, MPLS/SR-MPLS network 220 shown in FIG. 2, multicast network 500 shown in FIGS. 5A-5H). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
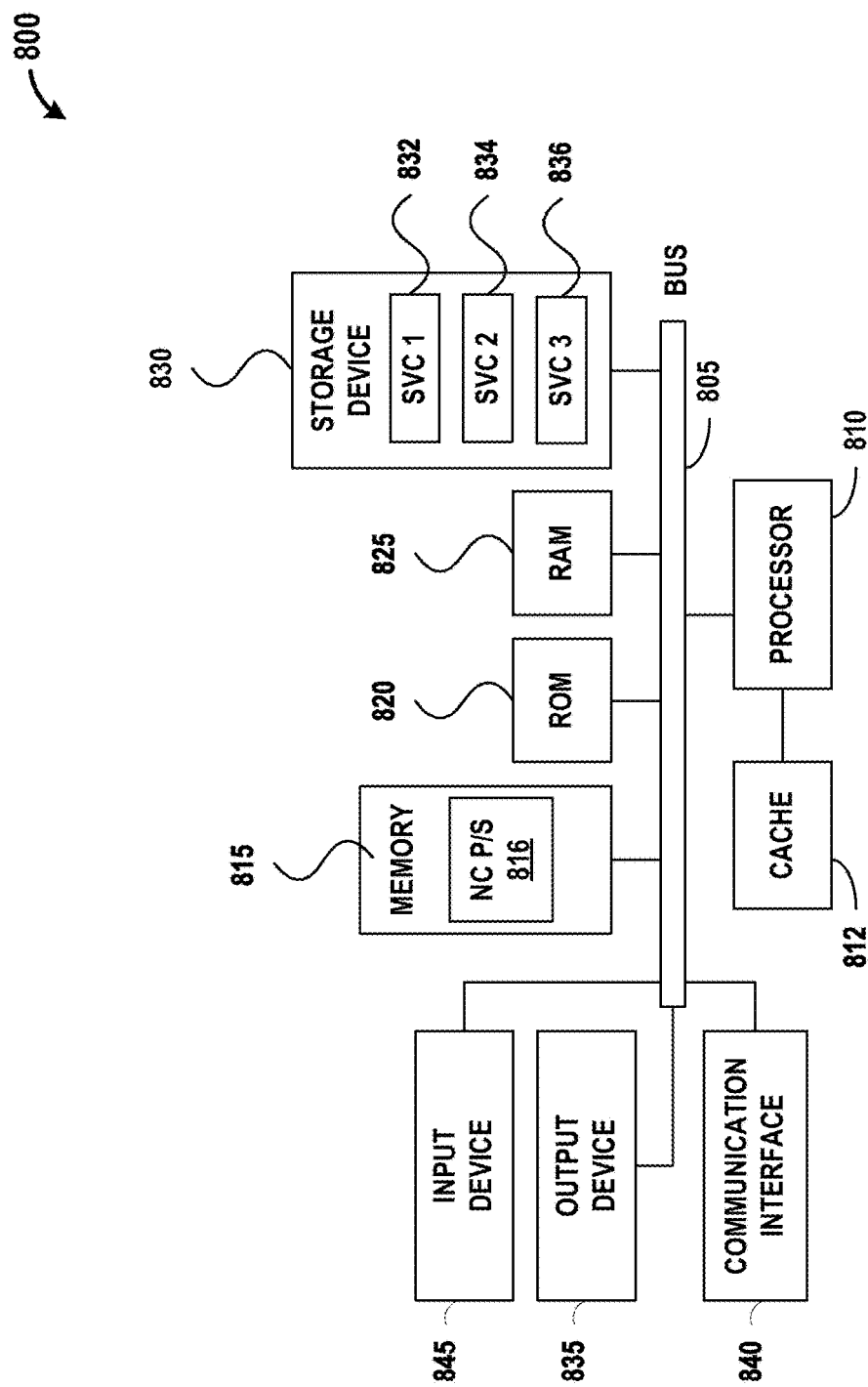
FIG. 8 illustrates an example of a bus computing system in accordance with some aspects of the present technology.

FIG. 8 illustrates an example of a bus computing system, according to some aspects of the present disclosure. Computing system 800 can be utilized as part of any one of the network components described above with reference to FIGS. 1-5H. Further, aspects of computing system 800 can be employed to apply aspects of method 600 shown in FIGS. 6A and 6B, which corresponds to various steps and functionalities outlined above with respect to FIGS. 5A-5H.

Components of the computing system 800 are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module (services), such as services SVC 1 832, SVC 2 834, and SVC 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software SVCs 832, 834, and 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function. In a further aspect, the memory 815 and/or the storage device 830 can also include network connection processes/services (abbreviated as NC P/S) 816 that includes instructions, which, when executed by the processor 810, cause the processor 810 to implement various functionalities discussed above and shown in FIGS. 5A-6B, including aspects of method 600.

For clarity of explanation, in some instances the various embodiments may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
   sending, by an egress provider edge device of a plurality of provider edge devices of an Ethernet Virtual Private Network (EVPN) instance, a source announcement to a first backup provider edge device of the EVPN instance and to an ingress provider edge device, wherein the source announcement includes Virtual Routing and Forwarding for Internet Protocol (IP-VRF) Extended Community (EC) information and Virtual Routing and Forwarding for Media Access Control (MAC-VRF) EC information;
   the egress provider edge device being in communication with a source operable for sending multicast content; and
   the ingress provider edge device being in communication with a subscriber requesting multicast content from the source;
   establishing a reverse path forwarding tunnel between the ingress provider edge device and the egress provider edge device using the IP-VRF EC information;
   establishing a unicast tunnel between the first backup provider edge device and the egress provider edge device using the MAC-VRF EC information;
   receiving, at the first backup provider edge device, multicast content from the source; and
   forwarding, at the first backup provider edge device and over the unicast tunnel between the first backup provider edge device and the egress provider edge device, multicast content from the source to the egress provider edge device.

2. The method of claim 1, further comprising:
   forwarding, by the ingress provider edge device, multicast content from the egress provider edge device to the subscriber.

3. The method of claim 1, further comprising:
   sending, by the ingress provider edge device in communication with the subscriber requesting content from the source over the multicast network, a join request message to the plurality of provider edge devices of the EVPN instance; and
   designating a first provider edge device of the plurality of provider edge devices of the EVPN instance as the egress provider edge device.

4. The method of claim 1, further comprising:
   advertising, by the plurality of provider edge devices of the EVPN instance and to the ingress provider edge device, a Unicast Prefix Advertisement that includes information about a location of respective provider edge devices of the EVPN instance; the Unicast Prefix Advertisement further including Extended Community (EC) information indicative of the EVPN instance.

5. The method of claim 1, further comprising:
   designating the first backup provider edge device as a new egress provider edge device, the new egress provider edge device being in communication with the source;
   establishing a reverse path forwarding tunnel between the new egress provider edge device and the ingress provider edge device; and
   forwarding, by the new egress provider edge device, multicast content from the source to the ingress provider edge device.

6. The method of claim 5, further comprising:
   establishing a unicast tunnel between a second backup provider edge device of the EVPN instance and the new egress provider edge device, the second backup provider edge device of the EVPN instance being operable for receiving multicast content from the source and forwarding the multicast content to the new egress provider edge device.

7. The method of claim 1, wherein the sending of the source announcement occurs after the ingress provider edge device sends a join request message to the plurality of provider edge devices of the EVPN instance, and wherein no reverse path forwarding tunnel is established at the time the join request message is sent.

8. The method of claim 1, wherein after receiving a join request message from the ingress provider edge device and before receiving the source announcement, a Multicast Routing Information Base (MRIB) state of the egress provider edge device and the first backup provider edge device includes an incoming interface set to an Integrated Routing and Bridging (IRB) interface.

9. The method of claim 1, wherein the unicast tunnel established between the first backup provider edge device and the egress provider edge device is a Broadcast, unknown-unicast and multicast (BUM) tunnel.

10. The method of claim 1, wherein the receiving and forwarding steps performed by the first backup provider edge device occur in response to the source ceasing communication with the egress provider edge device and initiating communication with the first backup provider edge device due to a source move or an Ethernet segment failure.

11. A system, comprising:
    one or more processors in communication with one or more memories, the one or more memories including instructions executable by the one or more processors to:
    send, by an egress provider edge device of a plurality of provider edge devices of an Ethernet Virtual Private Network (EVPN) instance, a source announcement to a first backup provider edge device of the EVPN instance and to an ingress provider edge device, wherein the source announcement includes Virtual Routing and Forwarding for Internet Protocol (IP-VRF) Extended Community (EC) information and Virtual Routing and Forwarding for Media Access Control (MAC-VRF) EC information;
    the egress provider edge device being in communication with a source operable for sending multicast content; and
    the ingress provider edge device being in communication with a subscriber requesting multicast content from the source;
    establishing a reverse path forwarding tunnel between the ingress provider edge device and the egress provider edge device using the IP-VRF EC information;
    establish a unicast tunnel between the first backup provider edge device and the egress provider edge device using the MAC-VRF EC information;
    receive, at the first backup provider edge device, multicast content from the source; and
    forward, at the first backup provider edge device and over the unicast tunnel between the first backup provider edge device and the egress provider edge device, multicast content from the source to the egress provider edge device.

12. The system of claim 11, the one or more memories further including instructions executable by the one or more processors to:
  forward, by the ingress provider edge device, multicast content from the egress provider edge device to the subscriber.

13. The system of claim 11, the one or more memories further including instructions executable by the one or more processors to:
  send, by the ingress provider edge device in communication with the subscriber requesting content from the source over the multicast network, a join request message to the plurality of provider edge devices of the EVPN instance; and
  designate a first provider edge device of the plurality of provider edge devices of the EVPN instance as the egress provider edge device.

14. The system of claim 11, the one or more memories further including instructions executable by the one or more processors to:
  designate the first backup provider edge device as a new egress provider edge device, the new egress provider edge device being in communication with the source;
  establish a reverse path forwarding tunnel between the new egress provider edge device and the ingress provider edge device;
    establish a unicast tunnel between a second backup provider edge device of the EVPN instance and the new egress provider edge device, the second backup provider edge device of the EVPN instance being operable for receiving multicast content from the source and forwarding the multicast content to the new egress provider edge device; and
  forward, by the new egress provider edge device, multicast content from the source to the ingress provider edge device.

15. The system of claim 11, the one or more memories further including instructions executable by the one or more processors to:
  advertise a Unicast Prefix Advertisement that includes information about a location of respective provider edge devices of the EVPN instance;
  the Unicast Prefix Advertisement further including Extended Community (EC) information indicative of the EVPN instance.

16. The system of claim 11, the one or more memories further including instructions executable by the one or more processors to:
  establish a unicast tunnel between a second backup provider edge device of the EVPN instance and the new egress provider edge device, the second backup provider edge device of the EVPN instance being operable for receiving multicast content from the source and forwarding the multicast content to the new egress provider edge device.

17. The system of claim 11, wherein the sending of the source announcement occurs after the ingress provider edge device sends a join request message to the plurality of provider edge devices of the EVPN instance, and wherein no reverse path forwarding tunnel is established at the time the join request message is sent.

18. The system of claim 11, wherein after receiving a join request message from the ingress provider edge device and before receiving the source announcement, a Multicast Routing Information Base (MRIB) state of the egress provider edge device and the first backup provider edge device includes an incoming interface set to an Integrated Routing and Bridging (IRB) interface.

19. The system of claim 11, wherein the unicast tunnel established between the first backup provider edge device and the egress provider edge device is a Broadcast, unknown-unicast and multicast (BUM) tunnel.

20. The system of claim 11, wherein the receiving and forwarding steps performed by the first backup provider edge device occur in response to the source ceasing communication with the egress provider edge device and initiating communication with the first backup provider edge device due to a source move or an Ethernet segment failure.

* * * * *